United States Patent [19]
Fermann et al.

[11] Patent Number: 5,818,630
[45] Date of Patent: Oct. 6, 1998

[54] SINGLE-MODE AMPLIFIERS AND COMPRESSORS BASED ON MULTI-MODE FIBERS

[75] Inventors: Martin E. Fermann; Donald J. Harter, both of Ann Arbor, Mich.

[73] Assignee: Imra America, Inc., Ann Arbor, Mich.

[21] Appl. No.: 882,349

[22] Filed: Jun. 25, 1997

[51] Int. Cl.⁶ ............................... H01S 3/08; H01S 3/10
[52] U.S. Cl. .................... 359/341; 359/116; 359/340; 372/19
[58] Field of Search ................... 359/116, 134, 359/160, 340, 341; 385/10, 28; 372/6, 19

[56] References Cited

U.S. PATENT DOCUMENTS

| | | |
|---|---|---|
| 3,808,549 | 4/1974 | Maurer . |
| 4,913,520 | 4/1990 | Kafka . |
| 5,187,759 | 2/1993 | DiGiovanni et al. . |
| 5,349,602 | 9/1994 | Mehuys et al. ............... 359/344 |
| 5,499,134 | 1/1996 | Galvanuskas et al. . |
| 5,513,196 | 4/1996 | Bischel et al. ............... 372/19 |

OTHER PUBLICATIONS

Poole et al, Fabrication of Low–Loss Optical Fibres Containing Rare–Earth Ions, Optics Letters, vol. 22, pp. 737–738 (1985).

D. Taverner et al, "158µJ Pulses From a Single–Transverse–Mode, Large–Mode–Area Erbium–Doped Fiber Amplifier", Optics Letters, vol. 22, No. 6, pp. 378–380, Mar. 15, 1997.

L. Yang et al, "Chirped–Pulse Amplification of Ultrashort Pulses with a Multimode Tm:Zblan Fiber Upconversion Amplifier", Optics Letters, vol. 20, No. 9, pp. 1044–1046, May 1, 1995.

U. Griebner et al, "Efficient Laser Operation with Nearly Diffraction–Limited Output from a Diode–Pumped heavily Nd–Doped Multimode Fiber", Optics Letters, vol. 21, No. 4, pp. 266–268, Feb. 15, 1996.

T. Strasser et al, "Reflective–Mode Conversion with UV–Induced Phase Gratings in Two–Mode Fiber", Optical Fiber Comm., Conf., vol. 2, 1996, pp. 348–349.

W. Gambling et al, "Pulse Dispersion for Single–Mode Operation of Multimode Cladded Optical Fibres", Lett., Elect. Lett., vol. 10, pp. 147–149, May 2, 1974.

(List continued on next page.)

*Primary Examiner*—Nelson Moskowitz
*Attorney, Agent, or Firm*—Sughrue, Mion, Zinn, Macpeak & Seas, PLLC

[57] ABSTRACT

To amplify and compress optical pulses in a multi-mode (MM) optical fiber, a single-mode is launched into the MM fiber by matching the modal profile of the fundamental mode of the MM fiber with a diffraction-limited optical mode at the launch end. The fundamental mode is preserved in the MM fiber by minimizing mode-coupling by using relatively short lengths of step-index MM fibers with a few hundred modes and by minimizing fiber perturbations. Doping is confined to the center of the fiber core to preferentially amplify the fundamental mode, to reduce amplified spontaneous emission and to allow gain-guiding of the fundamental mode. Gain-guiding allows for the design of systems with length-dependent and power-dependent diameters of the fundamental mode. To allow pumping with high-power laser diodes, a double-clad amplifier structure is employed. For applications in nonlinear pulse-compression, self phase modulation and dispersion in the optical fibers can be exploited. High-power optical pulses may be linearly compressed using bulk optics dispersive delay lines or by chirped fiber Bragg gratings written directly into the SM or MM optical fiber. High-power cw lasers operating in a single near-diffraction-limited mode may be constructed from MM fibers by incorporating effective mode-filters into the laser cavity. Regenerative fiber amplifiers may be constructed from MM fibers by careful control of the recirculating mode. Higher-power Q-switched fiber lasers may be constructed by exploiting the large energy stored in MM fiber amplifiers.

49 Claims, 10 Drawing Sheets

OTHER PUBLICATIONS

W. Gambling et al, "Mode Conversion Coeffiecients in Optical Fibers", Applied Optics, vol. 14 No. 7, Jul. 1975.

D. Gloge, "Optical Power Flow in Multimode Fibers", Bell System Technical Journal, vol. 51, pp. 1767–1783, May 8, 1972.

D. Harter, "Alexandrite–Laser–Pumped $Cr^{3+}$: llsRaLf$_6$", Optics Letters, vol. 17, pp. 1512–1514, Apr. 3, 1992.

M. Nisoli et al, "Generation of High–Energy 20 fs Pulses by a New Compression Technique", Cleo 91, paper CTuR5, pp. 189–190 (1996).

D. Marcus, "The Theory of Dielectric Optical Waveguides", pp. 238–239, Academic Press, (1974).

Waliano et al, Appl. Phys. Lett., vol. 63, #5, pp. 580–582, Aug. 2, 1993.

Luther et al, Louis. Opt. Joe. of America, B, vol. 7, 190 7, pp. 1216–1220; Jul. 1990.

Fermann et al, Proc. 1995 Opt. Fiber Commun. Comp., IEEE, pp. 39–40, Feb. 27, 1998.

Nybolah et al, IEEE Phatanics Tech. Lett., vol. 31, #12; Dec. 1991; pp. 1079–1081.

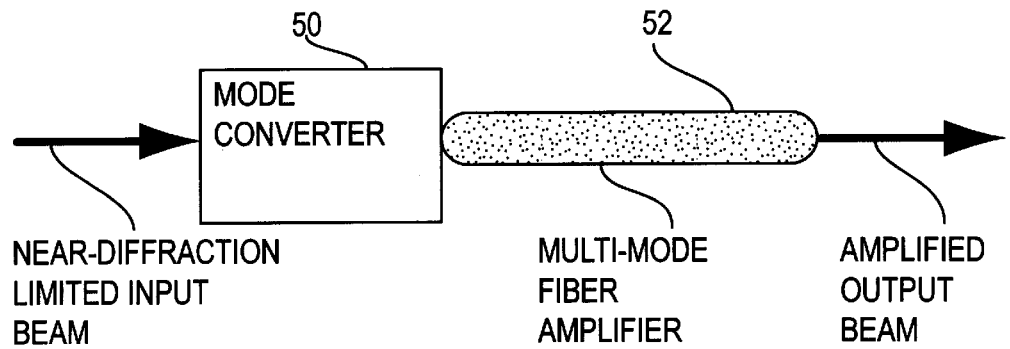
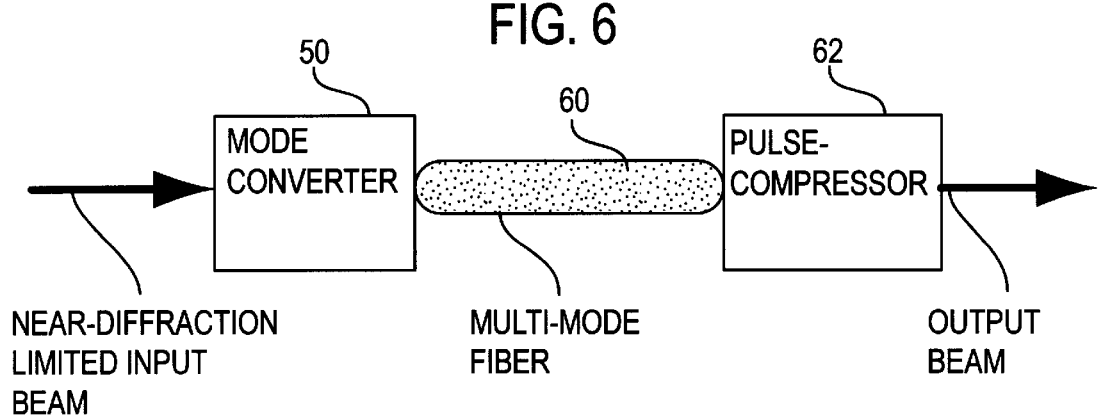

SINGLE-MODE AMPLIFIERS AND COMPRESSORS BASED ON MULTI-MODE FIBERS

BACKGROUND OF THE INVENTION

1. Field of the Invention

The present invention relates to the use of multi-mode fibers for amplification of laser light in a single-mode amplifier system.

2. Description of the Related Art

Rare-earth-doped optical fibers have long been considered for use as sources of coherent light, as evidenced by U.S. Pat. No. 3,808,549 to Maurer (1974), since their light-guiding properties allow the construction of uniquely simple lasers. However, early work on fiber lasers did not attract considerable attention, because no methods of generating diffraction-limited coherent light were known. Man current applications of lasers benefit greatly from the presence of diffract on limited light.

Only when it became possible to manufacture single-mode (SM) rare-earth-doped fibers, as reported by Poole et al. in "Fabrication of Low-Loss Optical Fibres Containing Rare-Ear Ions", *Optics Letters*, Vol. 22, pp. 737–738 (1985), did the rare-earth-doped optical fiber technology become viable. In this technique, only the fundamental mode of the optical fiber is guided at the lasing wavelength, thus ensuring diffraction-limited output.

Driven by the needs of optical fiber telecommunications for SM optical fiber amplifiers, nearly all further developments for more than a decade in this area were concentrated on perfecting SM fiber amplifiers. In particular, the motivation for developing SM fiber amplifiers stemmed from the fact that SM fiber amplifiers generate the least amount of noise and they are directly compatible with SM fiber optic transmission lines. SM fiber amplifiers also have the highest optical transmission bandwidths, since, due to the absence of any higher-order modes, modal dispersion is completely eliminated. In general, modal dispersion is the most detrimental effect limiting the transmission bandwidth of multi-mode (MM) optical fibers, since the higher-order modes, in general, have different propagation constants.

However, in the amplification of short-optical pulses, the use of SM optical fibers is disadvantageous, cause the limited core area limits the saturation energy of the optical fiber and thus the obtainable pulse energy. The saturation energy of a laser amplifier can be expressed as $$E_{sat} = \frac{h\nu A}{\sigma},$$

where h is Planck's constant, $\nu$ is the optical frequency, a is the stimulated emission cross section and A is the core area. The highest pulse energy generated from a SM optical fiber to date is about 160 $\mu$J (disclosed by Taverner et al. in *Optics Letters*, Vol. 22, pp. 378–380 (1997)), and was obtained from a SM erbium-doped fiber with a core diameter of 15 $\mu$m, which is about the largest core diameter that is compatible with SM propagation at 1.55 $\mu$m. This result was obtained with a fiber numerical aperture of NA≈0.07. Any further increase in core diameter requires a further lowering of the NA of the fiber and results in an unacceptably high sensitivity to bend-losses.

As an alternative to SM amplifiers amplification in multi-mode (MM) optical fibers has been considered. See, for example, "Chirped-pulse amplification of ultrashort pulses with a multimode Tm:ZBLAN fiber upconversion amplifier" by Yang et al., *Optics Letters*, Vol. 20, pp. 1044–1046 (1995). However, in general, amplification experiments in MM optical fibers have led to non-diffraction-limited outputs as well as unacceptable pulse broadening due to modal dispersion, since the launch conditions into the MM optical fiber and mode-coupling in the MM fiber were not controlled.

It was recently suggested by Griebner et al. in "Efficient laser operation with nearly diffraction-limited output from a diode-pumped heavily Nd-doped multimode fiber", *Optics Letters*, Vol. 21, pp. 266–268 (1996), that a near diffraction-limited output be can be obtained from a MM fiber laser when keeping the fiber length shorter than 15 mm and selectively providing a maximum amount of feedback for the fundamental mode of the optical fiber. In this technique, however, severe ode-coupling was a problem, as the employed MM fibers supported some 10,000 modes. Also, only an air-gap between the endface of the MM fiber and a laser mirror was suggested for mode-selection. Hence, only very poor modal discrimination was obtained, resulting in poor beam quality.

In U.S. Pat. No. 5,187,759 to DiGiovanni et al., it was suggested that amplified spontaneous emission (ASE) in a MM fiber can be reduced by selectively exciting any active ions lose to the center of the fiber core or by confining the active ions to the center of the fiber core. Since the overlap of the low-order modes in a MM optical fiber is highest with the active ions close to the center of the fiber core, any ASE will then also be predominantly generated in low-order modes of the MM fiber. As a result, the total amount of ASE can be greatly reduced in MM fiber, since no ASE is generated in high-order modes. However, DiGiovanni described dopant confinement only with respect to ASE reduction. DiGiovanni did not suggest that, in the presence of mode-scattering, dopant confinement can enhance the beam quality of the fundamental mode of the M fiber under SM excitation. Also, the system of DiGiovanni did not take into account the fact that gain-guiding induced by dopant confinement can in fact effectively guide a fundamental mode in a MM fiber. This further reduces ASE in MM fibers as well as allowing for SM operation.

In fact, the system of DiGiovanni et al. is not very practical, since it considers a MM signal source, which leads to a non-diffraction-limited output beam. Further, only a single cladding was considered for the doped fiber, which is disadvantageous when trying to couple high-power semiconductor lasers into the optical fibers. To couple high-power semiconductor lasers into MM fibers, a double-clad structure, as suggested in the above-mentioned patent to Maurer, can be of an advantage.

To the inventors' knowledge, gain-guiding has not previously been employed in optical fibers. On the other hand, gain-guiding is well known in conventional semiconductor and solid-state lasers. See, for example, "Alexandrite-laser-pumped $Cr^{3+}$:Li $rAlF_6$" by Harter et al., *Optics Letters*, Vol. 17, pp. 1512–1514 (1992). Indeed, in SM fibers, gain-guiding is irrelevant due to the strong confinement of the fundamental mode by the wave-guide structure. However, in MM optical fibers, the confinement of the ) fundamental mode by the waveguide structure becomes comparatively weaker, allowing for gain-guiding to set in. As the core size in a MM fiber becomes larger, light propagation in the fiber structure tends to approximate free-space propagation. Thus, gain-guiding can be expected eventually to be significant, provided mode-coupling can be mad sufficiently small. In addition to providing high pulse energies, MM optical fiber amplifiers can also be used to amplify very high peak power pulses due to their increased fiber cross section compared to SM fiber amplifiers. MM undoped fibers and MM amplifier fibers can also be used for pulse compression as recently disclosed by Fermann et al. in U.S. application Ser. No. 08/789,995 (filed Jan. 28, 1997). However, this work was limited to the use of MM fibers as soliton Raman compressors in conjunction with a nonlinear spectral filtering action to clean-up the spectral profile, which may limit the overall efficiency of the system.

Compared to pulse compression in SM fibers, such as that disclosed in U.S. Pat. No. 4,913,520 to Kafka et al., higher-pulse energies can be obtained in MM fibers due to the increased mode-size of the fiber. In particular, V-values higher than 2.5 and relatively high index differences between core and cladding (i.e. a $\Delta n > 0.3\%$) can be effectively employed. In "Generation of high-energy 10-fs pulses by a new pulse compression technique", Conference on Lasers and Electro-Optics, CLEO 91, paper DTuR5, Optical Society of America Technical Digest Series, #9, pp. 189–190 (1996), M. Nisoli et al. suggested the use of hollow-core fibers for pulse-compression, as hollow-core fibers allow an increase in the mode size of the fundamental mode. However, hollow-core fibers have an intrinsic transmission loss, they need to be filled with gas, and they need to be kept straight in order to minimize the transmission losses, which makes them highly impractical.

As an alternative to obtaining high-power pulses, chirped pulse amplification with chirped fiber Bragg gratings may be employed, as disclosed in U.S. Pat. No. 5,499,134 to Galvanauskas et al. (1996). One of the limitations of this technique is that, in the compression grating, a SM fiber with a limited core area is employed. Higher pulse energies could be obtained by employing chirped fiber Bragg gratings in MM fibers with reduced mode-coupling for pulse compression. Indeed, unchirped fiber Bragg gratings were recently demonstrated in double-mode fibers by Strasser et al. in "Reflective-mode conversion with UV-induced phase gratings in two-mode fiber", *Optical Society of America Conference on Optical Fiber Communication*, OFC97, pp. 348–349, (1997). However, these gratings were blazed to allow their use as mode-converters, i.e., to couple the fundamental mode to a higher-order mode. The use of Bragg gratings in pulse-compression calls for an unblazed grating to minimize the excitation of any higher-order modes in reflection.

It has long been known that a SM signal can be coupled into a MM fiber structure and preserved for propagation lengths of 100s of meters. See, for example, "Pulse Dispersion for Single-Mode Operation of Multimode Cladded Optical Fibres", Gambling et al., *Electron. Lett.*, Vol. 10, pp. 148–149, (1974) and "Mode conversion coefficients in optical fibers", Gambling et al., *Applied Optics*, Vol. 14, pp. 1538–1542, (1975). However, Gambling et al. found low levels of mode-coupling only in liquid-core fibers. On the other hand, mode-coupling in MM solid-core fibers was found to be severe, allowing for the propagation of a fundamental mode only in mm lengths of fiber. Indeed, as with the work by Griebner et al., Gambling et al. used MM solid-core optical fibers that supported around 10,000 or more modes.

In related work, Gloge disclosed in "Optical Power Flow in Multimode Fibers", The Bell System Technical Journal, Vol. 51, pp. 1767–1783, (1972), the use of MM fibers that supported only 700 modes, where mode-coupling was sufficiently reduced to allow SM propagation over fiber lengths of 10 cm.

However, it was not shown by Gloge that mode-coupling can be reduced by operating MM fibers at long wavelengths (1.55 $\mu$m) and by reducing the total number of modes to less than 700. Also, in this work, the use of MM fibers as amplifiers and the use of the nonlinear properties of MM fibers was not considered.

The inventors are not aware of any prior art using MM fibers to amplify SM signals where the output remains primarily in the fundamental mode, the primary reason being that amplification in MM fibers is typically not suitable for long-distance signal propagation as employed in the optical telecommunication area. The inventors are also not aware of any prior art related to pulse compression in multi-mode fibers, where the output remains in the fundamental mode.

All of the above-mentioned articles, patents and patent applications are hereby incorporated herein by reference.

SUMMARY OF THE INVENTION

It is an object of the present invention to increase the energy storage potential in an optical fiber amplifier and to produce peak powers and pulse energies which are higher than those achievable in single-mode (SM) fibers before the onset of undesirable nonlinearities and gain saturation.

Another object of the present invention is to achieve amplification of the fundamental mode within a multi-mode (MM) fiber while reducing amplified spontaneous emission (ASE).

A further object of the present invention is to employ gain-guiding within a MM fiber to improve the stability of the fundamental mode.

Yet another object of the present invention is to compress high peak power pulses into the range of a few psec to a fsec while preserving a near diffraction-limited output.

To achieve the above objects, the present invention employs a multimode (MM) optical fiber in an optical amplification system. According to the present invention, MM optical fibers, i.e., fibers with a V-value greater than approximately 2.5, provide an output in the fundamental mode. This allows the generation of much higher peak powers and pulse energies compared to SM fibers before the onset of undesirable nonlinearities and gain saturation. The increased fiber cross section equally greatly increases the energy storage potential in an optical fiber amplifier. The amplification system of the present invention is useful in applications requiring ultrafast and high-power pulse sources.

According to one aspect of the present invention, the gain medium is in the center of the MM fiber so that the fundamental mode is preferentially amplified and spontaneous emission is reduced. Further, gain-confinement is used to stabilize the fundamental mode in a fiber with a large cross section by gain guiding.

According to one embodiment of the present invention, the exploitation of self-phase modulation and other nonlinearities in (rare-earth) doped or undoped MM fibers allows the compression of high peak power pulses into the range of a few fsec while a near diffraction-limited output is preserved.

According to another embodiment of the present invention, by writing chirped fiber Bragg gratings into MM optical fibers with reduced mode-coupling, the power limits for linear pulse compression of high-power optical pulses are greatly increased. Further, by employing double-clad MM fiber amplifiers, pumping with relatively large-area high-power semiconductor lasers is made possible.

According to yet another embodiment of the present invention, the incorporation of efficient mode-filters enables cw lasing in a near diffraction-limited single mode from (rare-earth) doped MM optical fibers.

According to yet another embodiment of the present invention, MM optical fibers allow the construction of fiber optic regenerative amplifiers and high-power Q-switched lasers. Further, MM optical fibers allow the design of cladding-pumped fiber lasers using dopants with relatively weak absorption cross sections.

These and other objects and features of the present invention will be apparent from the following detailed description of the preferred embodiments and the accompanying drawings.

BRIEF DESCRIPTION OF THE DRAWINGS

FIG. 5 is a block diagram of a multi-mode fiber amplifier system according to the second embodiment of the present invention.

FIG. 6 is a block diagram of a multi-mode fiber amplifier system according to the third embodiment of the present invention, wherein a pulse compressor is disposed at an output of the multi-mode fiber.

DETAILED DESCRIPTION OF THE PREFERRED EMBODIMENTS

Figure 1:
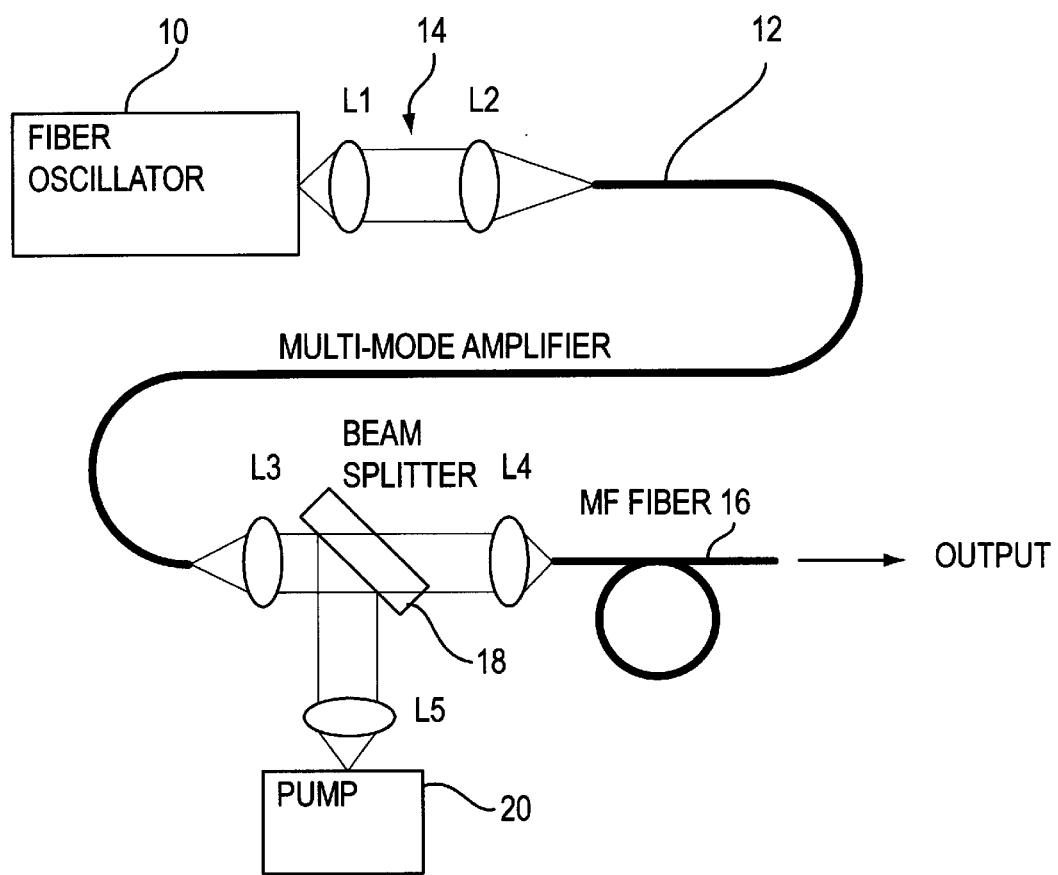
FIG. 1 is a diagrammatic view of a multi-mode fiber amplifier system according to the first embodiment of the present invention.

FIG. 1 illustrates an amplifier system according to a first embodiment of the present invention. In the example shown in FIG. 1, a femtosecond single-mode (SM) fiber oscillator 10, such as an erbium fiber oscillator, is coupled into a multi-mode (MM) fiber amplifier 12, such as an erbium/ytterbium fiber amplifier. Other examples of suitable MM fiber amplifiers include those doped with Er, Yb, Nd, Tm, Pr or Ho ions. Oscillators suitable for use in this system are described in the above-mentioned U.S. patent application Ser. No. 08/789,995 to Fermann et al.

A two-lens telescope 14 (L1 and L2) is used to match the mode from the oscillator 10 to the fundamental mode of the MM amplifier 12. In addition, the output of the pumped MM fiber 12 is imaged into a second SM fiber (mode-filter (MF) fiber 16 in FIG. 1) using lenses L3 and L4. Lenses L3 and L5 and beamsplitter 18 are used to couple the pump light from pump source 20 into the amplifier fiber, as described below.

In one example of the system arranged according to FIG. 1, the oscillator 10 delivers 300 fsec near bandwidth-limited pulses at a repetition rate of 100 MHz at a wavelength of 1.56 $\mu$m with a power level of 14 mW.

The amplifier fiber 12 can be, for example, a double-clad MM erbium/ytterbium amplifier with a core diameter of $\approx 28$ $\mu$m and a core numerical aperture of NA=0.19. The inner cladding in this example has a diameter of $\approx 220$ $\mu$m and a numerical aperture of NA=0.24. The core is located in the center of the inner cladding. The length of the amplifier is 1.10 m.

To increase the number of propagating modes in the MM amplifier 12 and for testing purposes, shorter wavelengths such as 780 and 633 nm were also used. In this, a femtosecond laser source operating at 780 nm and a cw laser source at 633 nm can be launched into the MM amplifier fiber 12. The MF fiber 16 can then be replaced with a fiber with a core diameter of 4 $\mu$m to ensure SM operation at these two wavelengths.

The approximate number of modes in the MM amplifier is calculated from its V-value.

$$V = \frac{2\pi a}{\lambda} NA, \quad \text{number of modes} = \frac{1}{2} V^2 \qquad (1)$$

where a is the core radius and $\lambda$ is the signal wavelength. The V-value at 1.55 $\mu$m is thus V$\approx$10.8, and the number of modes is hence calculated as $\approx$58 for the above example. Typically, a fiber is considered MM when the V–value exceeds 2.41, i.e., when modes in addition to the fundamental mode can propagate in the optical fiber.

For equal excitation of N modes of a MM fiber supporting N modes the maximum coupling efficiency into a SM fiber is given approximately by $$\eta \approx (\theta_0/\theta_{max})^2 \approx 1/N, \qquad (2)$$

where $\theta_0 \approx \lambda/4a$ is the divergence half-angle of the fundamental mode of the MM fiber. $\theta_{max}$ is the maximum divergence half-angle of the outer-most modes of the MM fiber. It is assumed that the output from the MM fiber is linearly polarized which is an appropriate assumption for the excitation of the lowest order modes in the fiber. Under SM excitation of the MM fiber and in the absence of mode-coupling, $\theta_{max}(z)=\theta_0$ independent of fiber length. However, in the presence of mode-coupling $\theta_{max}$ will increase, and, as a result, the possible coupling efficiency from the output of the MM fiber into a SM fiber will decrease as $\eta(z)=(\theta_0/\theta_{max}(z))^2$. Using the above-mentioned work by Gloge, $\eta(z)$ can be written as:

$$\eta(z) = \frac{\theta_0^2}{4Dz + \theta_0^2} . \qquad (3)$$

where D is the mode-coupling coefficient as defined by Gloge. Thus, a measurement of $\eta(z)$ gives the mode-coupling coefficient D. Equally, from equation (2), a measurement of η gives the approximate number of excited modes of a MM fiber. It is instructive to relate N to the $M^2$-value that is typically used to characterize the quality of near-diffraction-limited optical beams. It may be shown that $N \approx \sqrt{M^2}$. According to the present invention, a low level of mode-coupling is desirable, so that the amplified beam provided at the output of the MM fiber amplifier 12 is substantially in the fundamental mode. Accordingly, an $M^2$-value less than 10 is desirable, with an $M^2$-value less than 4 being preferable, and an $M^2$-value less than 2 being more preferable. Further, the number of modes is preferably in the range of 3 to 3000 and more preferably in the range of 3 to 1000.

Mode-coupling was measured in a 1.1 m length of unpumped amplifier fiber for the above-described erbium/ytterbium fiber (fiber 1), and three commercially available MM-fibers (fiber 2, 3 and 4). The fiber parameters and the mode-coupling coefficient D (in $m^{-1}$) of these fibers are shown in Table 1. Fibers 1, 3 and 4 are made by the MCVD process; fiber 2 is made by a rod-in-tube technique.

TABLE 1

| | fiber 1 | fiber 2 | fiber 3 | fiber 4 |
|---|---|---|---|---|
| NA | 0.19 | 0.36 | 0.13 | 0.13 |
| core diameter (μm) | 28 | 50 | 50 | 50 |
| cladding diameter (μm) | 200 | 125 | 125 | 250 |
| number of modes at 1.55 μm | 58 | 665 | 87 | 87 |
| number of modes at 0.79 μm | 223 | | | |
| number of modes at 0.63 μm | 350 | | | |
| $D(m^{-1})$ at 1.55 μm | $<2 \times 10^{-6}$ | $8 \times 10^{-4}$ | $8 \times 10^{-5}$ | $7 \times 10^{-6}$ |
| $D(m^{-1})$ at 0.79 μm | $4 \times 10^{-6}$ | | | |
| $D(m^{-1})$ at 0.63 μm | $2 \times 10^{-5}$ | | | |
| $L_b$(mm) at 1.55 μm | 1.9 | 5.3 | 5.7 | 5.7 |
| $L_b$(mm) at 0.79 μm | 3.3 | | | |
| $L_b$(mm) at 0.63 μm | 4.1 | | | |
| $M^2$(1 m) at 1.55 μm | 1.0 | 200 | 5.4 | 1.25 |
| $M^2$(1 m) at 0.79 μm | 1.2 | | | |
| $M^2$(1 m) at 0.63 μm | 2.6 | | | |

The coupling coefficients allow, in turn, the calculation of the expected $M^2$ value. In this example, the calculated $M^2$-values were produced after propagation through 1 m of MM fiber 12. For fiber 1, a good agreement between the calculated and separately measured $M^2$-values was obtained.

The beat length $L_b$ between the fundamental $LP_{01}$ and the next higher-order $LP_{11}$ mode is also given in Table 1. The beat length $L_b$ is defined as the length it takes for the two modes to accumulate a differential phase-shift of $2\pi$ along the propagation direction. Assuming a constant scattering power spectrum, for a fixed wavelength, D can be shown to be proportional to $L_b^4$.

See: D. Marcuse, "The Theory of Dielectric Optical Waveguides", p. 238, Academic Press (1974); Gloge. The longer the beat length, the closer the modes are to being phase-matched and the more power will couple as a function of length. Since, as disclosed by Gloge, mode-coupling is expected to be largest between adjacent modes, it is desirable to use $LP_{01}/LP_{11}$ beat lengths as short as possible to avoid mode-coupling.

In general, high levels of mode-coupling can be expected from fibers with high scattering loss. This suggests the possibility of low mode-coupling coefficients at long wavelengths in fibers with low scattering loss. As can be seen from Table 1, a dramatic reduction of mode-coupling occurs with increased wavelength in fiber 1. An acceptable level of mode-coupling is achieved in fiber 1 down to wavelengths as short as 790 nm. Since the number of modes of an optical fiber depends only on the ratio a/λ, a fiber similar to fiber 1 with a core diameter as large as 56 μm can produce acceptable levels of mode-coupling in a 1 m length. Due to the reduction of scattering at longer wavelengths, even larger core diameters are acceptable at longer wavelengths. For example, a MM fiber with a core diameter of 60 μm can amplify pulses with a peak power 16 times larger than possible with SM amplifiers described by Taverner et al. Indeed, acceptable levels of mode coupling were obtained for a specifically designed fiber with a 50 μm core diameter as evident from Table 1 and explained in the following.

Further, it is clear that, to minimize mode-coupling, step-index MM fibers are more useful than graded-index MM fibers, since the propagation constants in graded-index fibers are very similar, which greatly increases their sensitivity to mode coupling. To minimize mode-coupling, the difference in the propagation constants between fiber modes is preferably maximized.

Fiber 2 was manufactured by a rod-in-tube technique with intrinsic high scattering losses leading to much larger mode-coupling coefficients compared to the MCVD-grown fibers 1, 3 and 4. Also, the mode-coupling coefficients measured in fiber 2 are similar to results obtained by Gambling et al. and Griebner et al., who also used step-index solid-core fibers manufactured by rod-in-tube techniques. As a consequence, reduced mode-coupling can be expected from directly grown MM fibers employing, for example, MCVD, OVD, PCVD or VAD fiber fabrication techniques.

As shown in Table 1, the mode-coupling coefficients obtained in fiber 4 at 1.55 μm are about a factor of 11 smaller than in fiber 3. This difference is explained by the fact that the outside diameter of fiber 4 is 250 μm, whereas the outside diameter of fiber 3 is 125 μm. In general, a thicker fiber is stiffer and less sensitive to bend and micro-bend induced mode-coupling, as evident from Table 1.

In experiments conducted by the inventors, the lowest mode-coupling coefficients were obtained by longitudinally stretching the optical fibers. For, example, the mode-scattering coefficients of fiber 2 and 3 were measured while keeping the fiber under tension and while keeping the fiber straight. The application of tension in short lengths of fibers can be useful in obtaining the best possible mode-quality.

Mode-coupling was also measured in a configuration where the amplifier fiber (fiber 1) was pumped, as shown in FIG. 1. Specifically, the amplifier was pumped at a wavelength of 980 nm contra-directionally with respect to the signal with a launched power up to 3 W from a broad-stripe semiconductor laser with an active area of 1×500 μm, where demagnification was employed to optimize the power coupling into the inner cladding of the MM amplifier fiber. The amplifier was cleaved at an angle of about 8° to eliminate spurious feedback. A signal power up to 100 mW was then extracted from the amplifier system at 1.56 μm.

Figure 2:
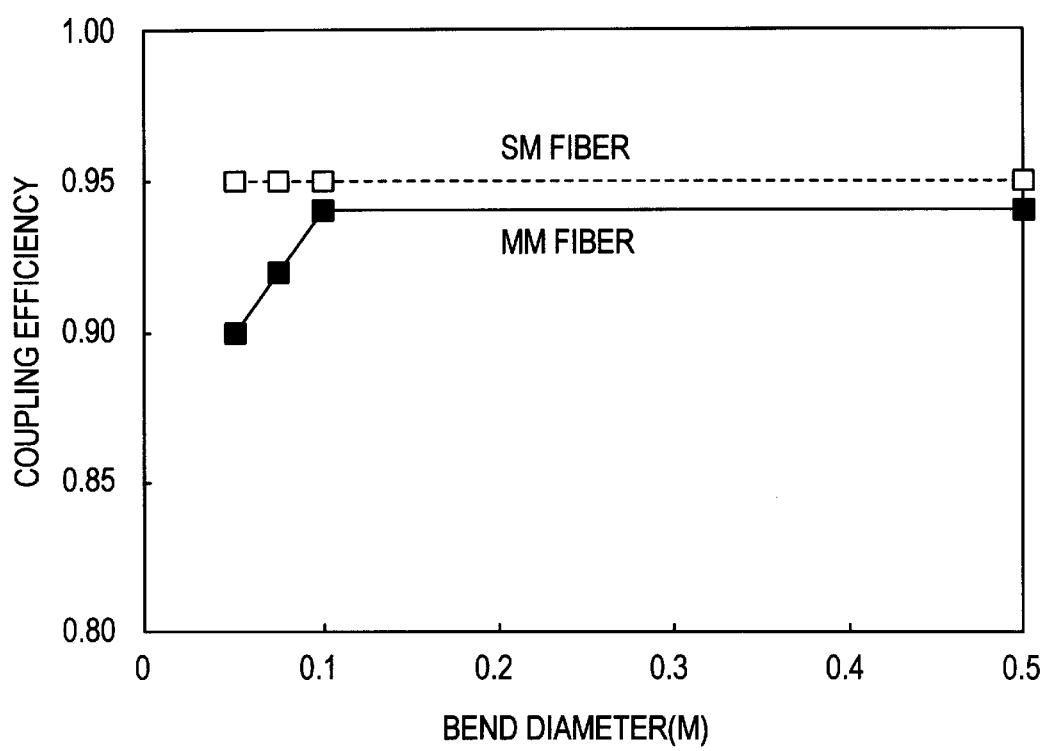
FIG. 2 is a graph showing the coupling efficiency of a multi-mode amplifier fiber into a mode-filter fiber as a function of bend-radius of the multi-mode amplifier fiber.

The coupling efficiency of the MM amplifier fiber 12 into the MF fiber 16 as a function of bend-radius of the MM amplifier fiber 12 is shown in FIG. 2. For a straight MM amplifier fiber and for a bend-radius of 10 cm, a coupling efficiency up to 94% is obtained into the MF fiber 16, demonstrating that mode-coupling is nearly completely absent in the MM amplifier fiber 12 and that a SM can indeed propagate over lengths of several meters in such fibers. No clear onset of mode-coupling is visible even for a bend-radius of 5 cm, since, even in this case, a coupling efficiency of about 90% from the MM amplifier fiber 12 to the MF fiber 16 is obtained.

Since the measured coupling efficiencies from the MM amplifier 12 to a SM fiber are nearly the same under unpumped and pumped conditions, it is evident that gain-guiding is relatively weak in this particular amplifier fiber. This observation was also verified by a simple computer model (see below). However, clearly any dopant confinement in the center of the MM amplifier core will predominantly lead to amplification of the fundamental mode. Any light scattered into higher-order modes will experience less gain and, due to the reduced intensity overlap of the higher-order modes with the fundamental mode, low levels of scattered light in higher-order modes will also not saturate the gain of the fundamental mode. Thus, while in the above-described experimental example, the mode-scattering coefficients were so low that any effects due to gain-guiding were not readily observable, in general, gain-guiding plays a role in a MM amplifier system according to the present invention. In addition, the above-mentioned computer model predicts the onset of gain-guiding of the fundamental mode in MM fibers with larger core diameter and/or reduced refractive index differences between the core and cladding.

As the mode diameter increases, the size of the SM can be determined by the gain profile under small signal conditions, i.e. in the absence of gain saturation. This allows a length-dependent mode size. Initially, under small signal conditions, the mode is confined by gain-guiding. As the gain saturates, gain guiding becomes less relevant and the mode size can increase, limited eventually by the core of the MM fiber. A length-dependent mode size can also be achieved by employing a core size which tapers along the fiber length. This can, for example, be achieved by tapering the outside fiber diameter along the fiber length.

In the presence of gain-guiding, amplified spontaneous emission (ASE) is reduced, as the MM fiber essentially becomes SM. In the presence of gain-guiding, ASE is also guided predominantly in the fundamental mode, rather than in all possible modes of the MM fiber, leading to an improvement in the noise properties of the MM fiber.

Equally, in the experimental example, dopant-confinement was observed to lead to a significant reduction in the amplified spontaneous emission (ASE) levels in the fiber. This was verified by measuring the coupling efficiency of the ASE from the MM amplifier 12 into the MF fiber 16. In this case, no signal light was coupled into the MM amplifier fiber 12. For an ASE power level of 1 mW, a coupling efficiency as high as 15% was measured. A comparison with equation (2) indicates that ASE is generated mainly in about 13 low-order modes (here a factor of two from polarization degeneracy is accounted for), i. e., ASE is generated in only about 20% of the total mode-volume of the amplifier fiber. The large reduction in ASE which was observed not only reduces the noise level in the amplifier; low levels of ASE also allow a reduction of the signal power that is required to saturate the amplifier. To extract the highest energy from an oscillator-amplifier signal pulse source, an operation of the amplifier in saturation is generally preferred.

The coupling efficiency at 1.55 $\mu$m and at 780 nm from the MM amplifier fiber 12 to the MF fiber 16 was not found to vary when applying small mechanical perturbations to the optical fiber. In a practical optical system, the applied mechanical perturbations are small compared to the perturbations inflicted by a 5 cm bend radius, which indicates that long-term stability of the mode-propagation pattern in such fibers can be achieved.

The MM amplifier 12 is polarization preserving for bend-radii as small as 10 cm. To obtain a high-degree of polarization holding, elliptical fiber cores or thermal stresses can be used in such fibers.

Figure 3:
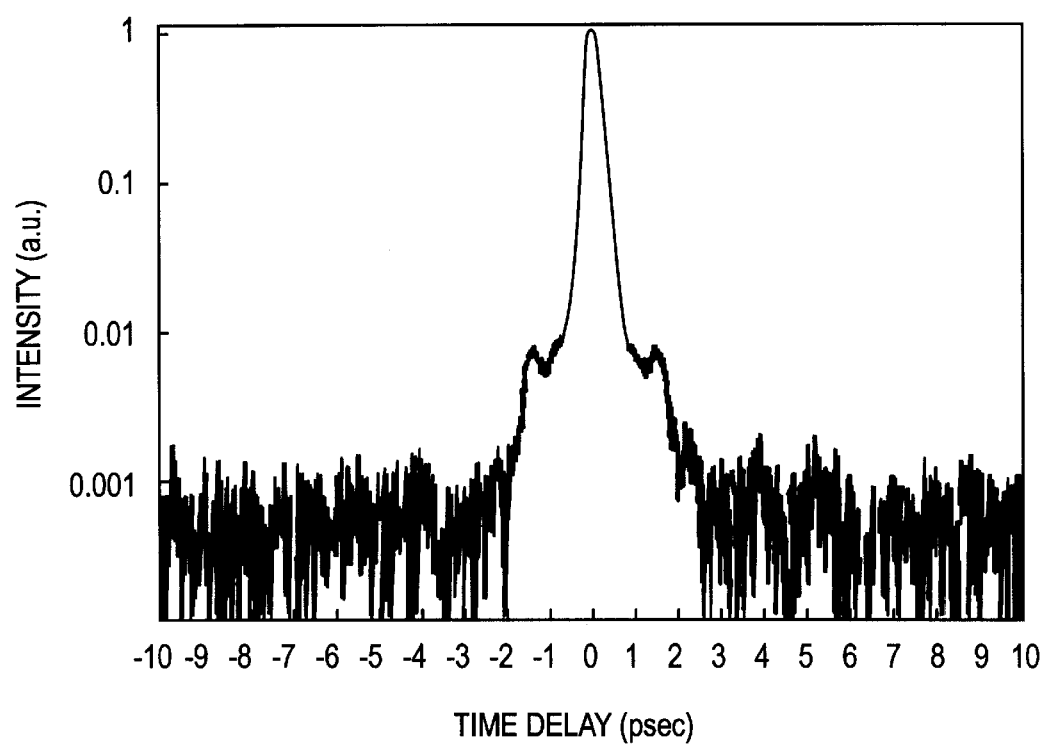
FIG. 3 is a graph showing the autocorrelation of the amplified pulses from a multi-mode amplifier fiber measured under optimum mode-match conditions.
Figure 4:
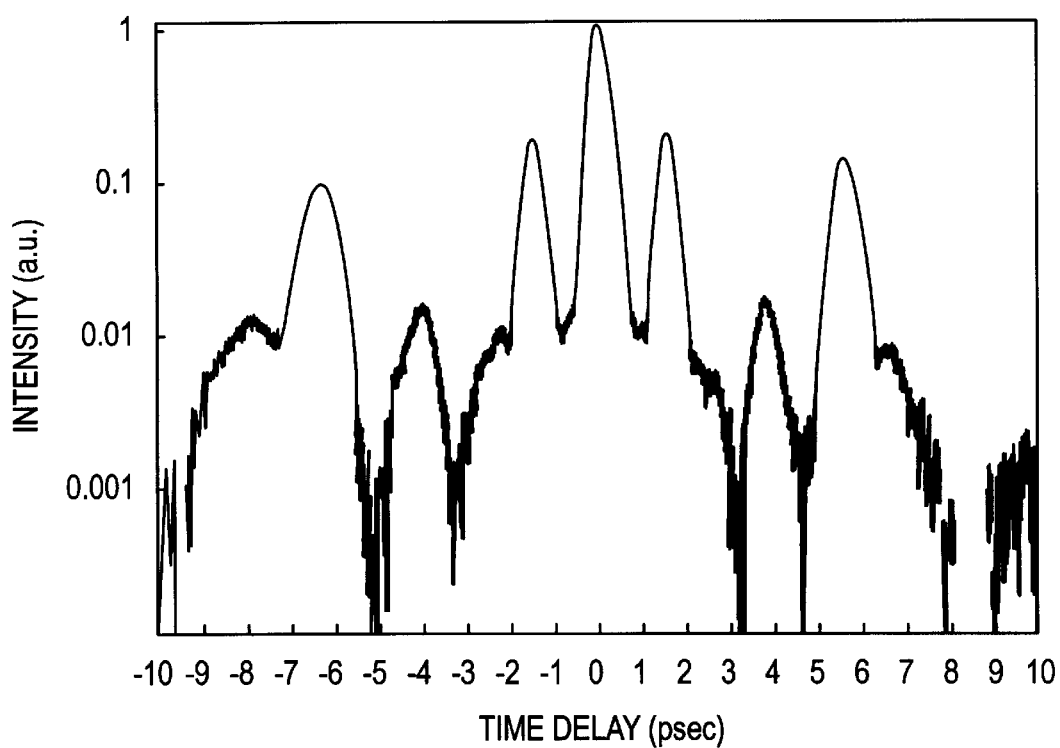
FIG. 4 is a graph showing the autocorrelation of the amplified pulses from a multi-mode amplifier fiber measured under non-optimum mode-match conditions.

The autocorrelation of the amplified pulses from the MM amplifier fiber 12 (bend radius=10 cm) measured under the condition of optimum mode-match and a condition of non-optimum mode-match are respectively shown in FIGS. 3 and 4. Under non-optimum mode-match, the autocorrelation displays several peaks due to the excitation of higher-order modes, which have different propagation constants. However, under optimum mode-matching conditions, any secondary peaks are suppressed to better than 1%, which indicates the high-quality of the pulses emerging from the MM amplifier fiber.

In general, the spectrum of the pulses measured at the output of the MM amplifier fiber 12 is more critically dependent on the coupling conditions than the autocorrelation. The reason for this is that the spectral measurement is sensitive to the phase between the fundamental mode and the higher-order modes, i.e., an energy content of higher-order modes of only 1% in the output of the MM fiber leads to a perturbation of the shape of the spectrum by 10%

FIG. 5 is a block diagram of a multi-mode fiber amplifier system according to a second embodiment of the present invention. The system includes a near-diffraction limited input beam, a mode-converter 50 and a MM fiber amplifier 52. The near-diffraction limited input beam can be generated from any laser system, which need not be a fiber laser. The near-diffraction limited input beam can contain cw or pulsed radiation. The mode-converter 50 can consist of any type of optical imaging system capable of matching the mode of the MM amplifier 52. For example, a lens system may be employed. Alternatively, a section of tapered fiber may be employed, such that the output mode at the end of the tapered fiber is matched to the mode of the MM amplifier fiber 52. In this case, the mode-converter can be spliced directly to the MM fiber 52 producing a very compact set-up. Any pumping configuration could be employed for the MM amplifier fiber, such as contra- or co-directional pumping with respect to the signal or side-pumping. Equally, the NA of the pump light could be reduced to minimize ASE. In this case, the use of just a single-clad fiber is more advantageous, where the pump light is directed into the fiber core. In general, the MM amplifier 52 can have a single, double or multiple cladding.

In the case of co-directional pumping, the pump light and the signal light are launched via a dichroic beamsplitter (not shown). The coupling optics are then optimized to simultaneously optimize the coupling of the pump beam and the signal beam.

A single or a double pass of the signal through the MM fiber 52 is most convenient. In the case of a double-pass configuration, a Faraday rotator mirror can be employed to eliminate polarization drifts in the system. Of course, in a double-pass configuration, after the first pass through the amplifier the coupling of the signal into higher-order modes must be avoided to ensure a near-diffraction limited output.

Optionally, linear or nonlinear optical elements can be used at the output of the system. Such a system is compatible with any application that has been used in conjunction with conventional laser systems.

Many nonlinear applications indeed require high peak pulse powers for their efficient operation, which are very difficult to achieve in cladding-pumping SM amplifiers due to the 10s of meters of fiber length that are typically employed in such systems. Even in standard SM optical amplifiers, peak powers greater than 1 kW/amplifier length can rarely be achieved. In contrast, peak powers of ≈15 kW are achievable in a 1.5 m length of double-clad Er/Yb fiber (fiber 1 from Table 1) without appreciable non-linear effects, i.e., peak powers greater than 20 kW/amplifier length can be achieved.

According to the present invention, the use of a MM amplifier is beneficial not only by way of allowing the use of a large core diameter; the use of a MM amplifier also allows a reduction of the ratio cladding/doped core diameter, which minimizes the amplifier length and thus the amplifier non-linearity. However, this leads to the generation of more ASE noise.

FIG. 6 is a block diagram illustrating a multi-mode fiber amplifier system according to a third embodiment of the present invention. In the system of the third embodiment, high-power optical pulses can be propagated (or amplified) in undoped (or amplifier) MM fibers, such that spectral broadening is obtained to allow for pulse compression of the amplifier output. For applications in nonlinear pulse-compression, optical fibers with either positive (non-soliton-supporting) or negative (soliton-supporting) dispersion can be employed. The power levels in the multi-mode fiber 60 are raised to obtain an appreciable amount of self-phase modulation. The interplay of dispersion and self-phase modulation in the optical fiber can then be used to broaden the spectrum of the optical pulses and to obtain pulse compression.

When the MM fiber 60 is soliton supporting, higher-order soliton compression may be used to produce short pulses from the MM fiber 60 directly. In general, in the case of positive dispersion (non-soliton supporting) fiber, additional linear or nonlinear pulse-compression components must be used to compress the spectrally broadened optical pulses. In this case, a conventional linear pulse compressor 62 (such as a prism, grating, grism or SM chirped fiber Bragg grating) may be used at the output of the system. Also, chirped periodically poled doubling crystals may be used to obtain a compressed, frequency-doubled pulse. Equally, chirped fiber Bragg gratings may be written into the MM optical fiber 60 with reduced mode-coupling to reduce the nonlinearities of such structures when applied to linear pulse compressor 62. The Bragg grating should not be blazed to eliminate the excitation of higher-order modes in reflection.

Figure 7:
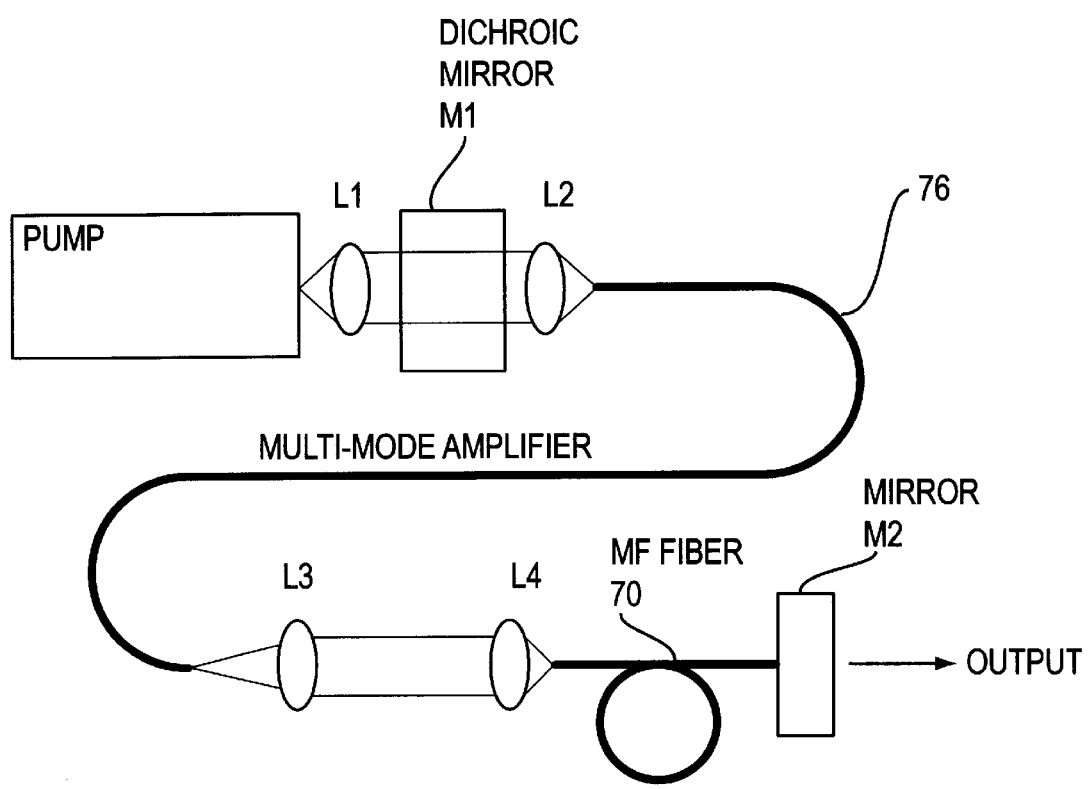
FIG. 7 is a diagrammatic view of a multi-mode fiber amplifier system according to a fourth embodiment of the present invention.

FIG. 7 is a diagrammatic view of a system according to a fourth embodiment of the present invention. As shown in FIG. 7, a mode-filter 70 is inserted in front of one of the cavity mirrors M1 and M2 to ensure a diffraction-limited output of the system. The mode filter 70 can consist of a standard SM fiber in conjunction with appropriate mode-matching optics. Alternatively, a tapered fiber can be used (as discussed above) to provide for mode-matching. For optimum mode-coupling the efficiency of the laser will be nearly as high as for an all-SM laser. However, the use of MM amplifier 76 allows for increased design flexibility. Thus, double-clad erbium/ytterbium fibers with different core-cladding ratios can be employed wherever appropriate.

Figure 8:
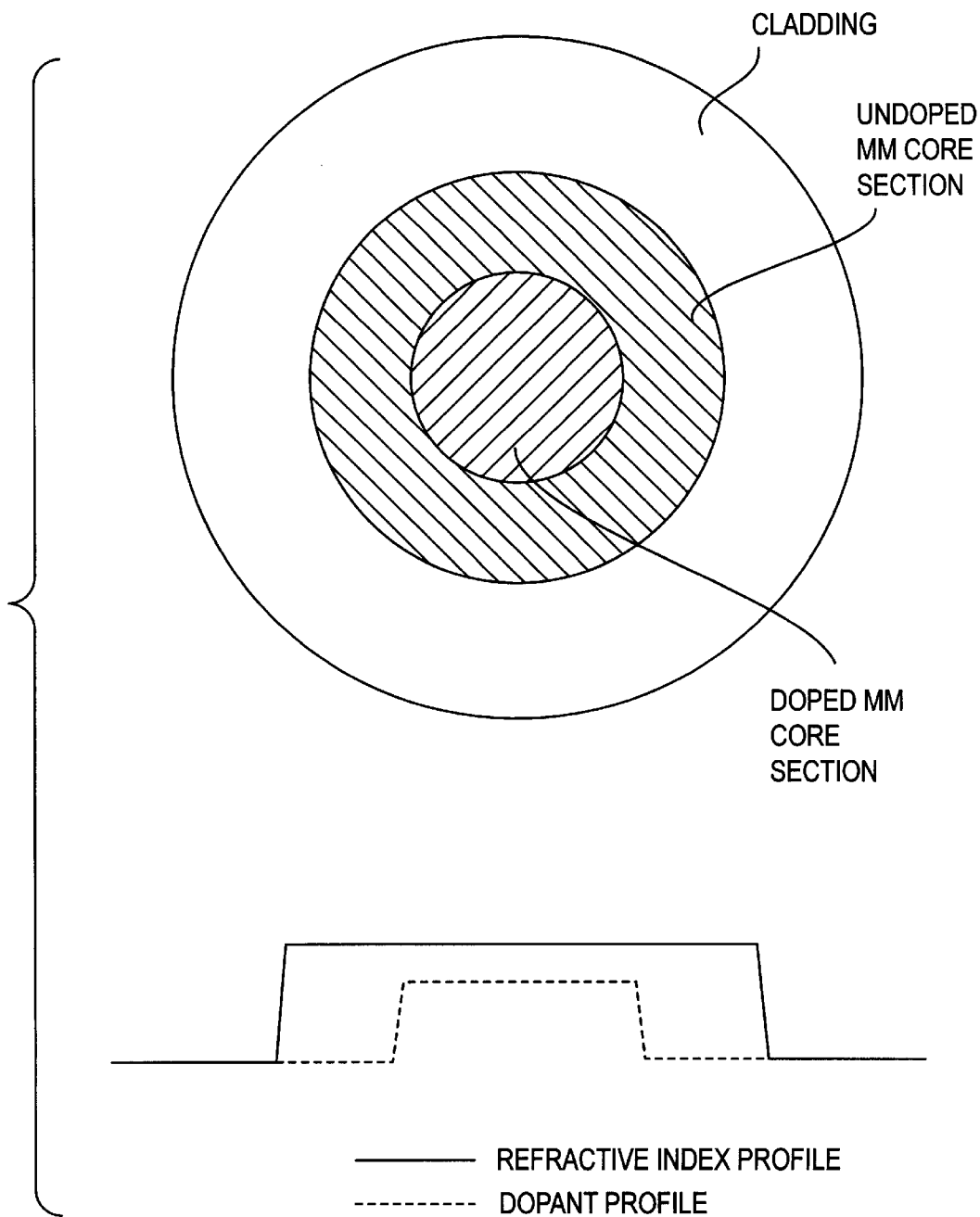
FIG. 8 is a conceptual drawing of a fiber cross section employing a doped multi-mode fiber core and an undoped fiber cladding according to a fifth embodiment of the present invention.

According to a fifth embodiment, the use of MM fiber allows the design of double-clad fibers with low absorption cross sections. For example, a double-clad Er-doped amplifier fiber may be constructed from MM fibers. Typically Er-doped double-clad fibers are relatively inefficient, since large cladding/core ratios have to be employed in order to absorb pump light from broad area diode lasers while still preserving a SM fiber core. Typically, such a design would involve a $\Phi_{cl}=100$ $\mu$m diameter cladding and a $\Phi_{co}=10$ $\mu$m diameter core. The effective absorption of such a structure is 100 times $(=\Phi_{cl}/\Phi_{co})^2$ smaller than the absorption in a single-clad Er-doped fiber. Thus, 100 times longer fiber amplifier lengths are required in this case. However, by implementing MM Er-doped fiber, the core size can be greatly increased, producing much smaller cladding/core ratios and shorter amplifier lengths which is very beneficial for the design of high-power lasers. Of course, for the design of high-power Er double-clad lasers, cladding diameters even larger than 100 $\mu$m can be implemented. A conceptual drawing of a fiber cross section employing a doped MM fiber core and an undoped fiber cladding is shown in FIG. 8. As shown in FIG. 8, the active dopant is confined in a cross section, defined by the dopant profile, substantially smaller than the fiber core, as defined by the refractive index profile. Of course, in such laser system, dopant confinement increases the amplifier length, thus only relatively weak doping confinement is useful.

Figure 9:
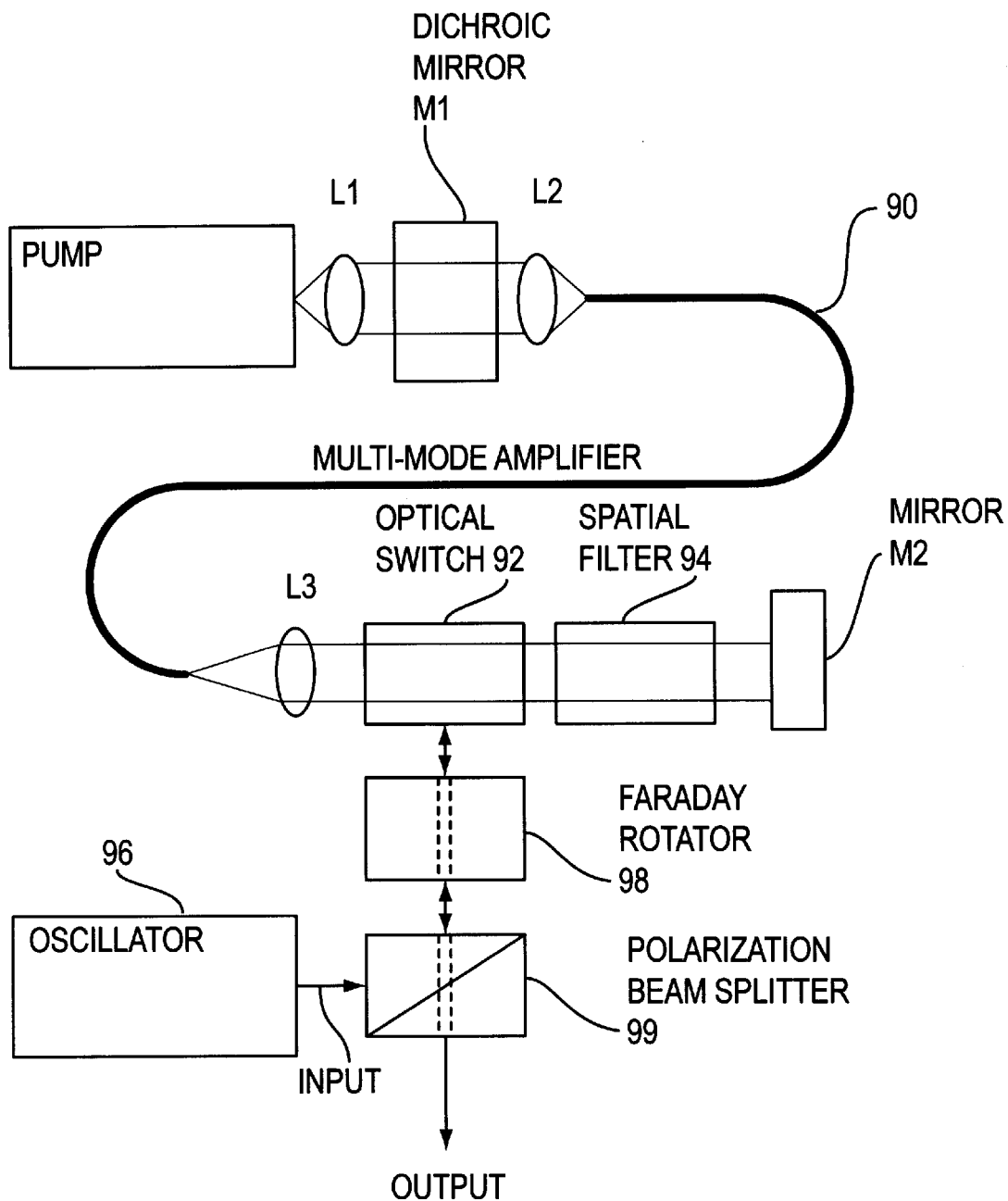
FIG. 9 is a diagrammatic view of a multi-mode fiber amplifier system according to a sixth embodiment of the present invention, wherein a fiber regenerative amplifier is constructed from a multi-mode fiber amplifier.

According to a sixth embodiment of the present invention, as shown n FIG. 9, a fiber regenerative amplifier may be constructed from a MM fiber amplifier 90. A regenerative amplifier is useful for obtaining mJ energies from MM fiber amplifiers. Due to the limited gain of MM fiber amplifiers, the extraction of mJ energies will typically require several passes through the amplifier, which is facilitated by the regenerative amplifier. As shown in FIG. 9, a fast optical switch (OS) 92 is used to switch the pulses in and out of the regenerative amplifier. A mode-filter 94 can also be included to "clean-up" the fiber mode in the amplification process. The mode-filter 94 can consist of a spatial filter to minimize any nonlinearities in the regenerative amplifier.

The seed pulse is selected from the oscillator 96 by the optical switch 92 at the desired repetition rate. The Faraday rotator 98 and the polarization beam splitter 99 are used to couple the amplified pulse out of the system.

Either cw or pulsed pumping of the amplifier can be employed.

Figure 10:
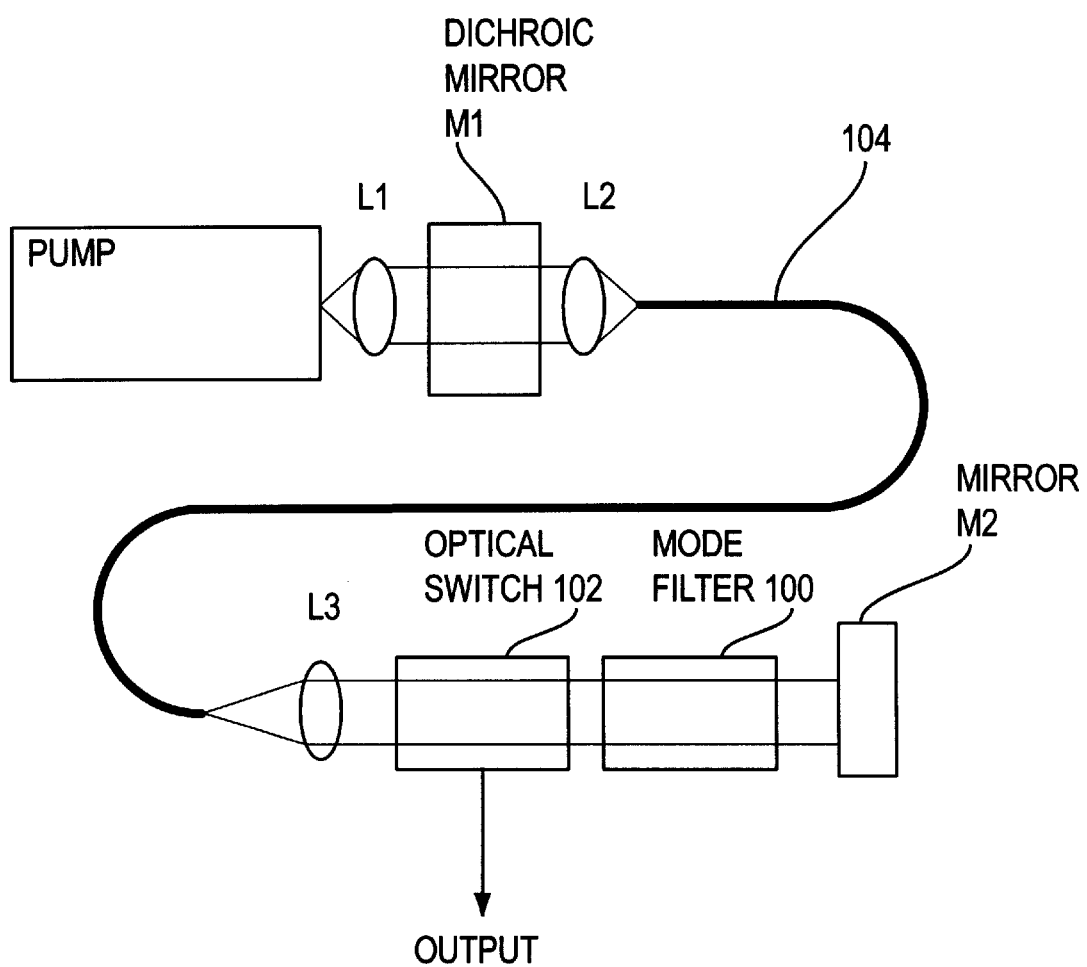
FIG. 10 is a diagrammatic view of a multi-mode fiber amplifier system according to a seventh embodiment of the present invention, wherein a MM Q-switched fiber laser source is constructed.

According to a seventh embodiment of the present invention shown in FIG. 10, a MM Q-switched fiber laser source is constructed. The large cross-sections possible with MM fibers allow greatly increasing the energy storage compared to a single-mode fiber. As a result, high-power Q-switched pulses may be directly generated from such a system. Typically, these pulses have a duration in the nsec regime. As shown in FIG. 10, a mode-filter 100 can also be included to ensure an optimum mode-quality. The optical switch 102 is employed for output coupling and it also serves to modulate the loss (Q) of the cavity defined by the two mirrors M1 and M2 and the MM amplifier 104. Alternatively, the output can be extracted by using a partially transmissive mirror M2.

Figure 11:
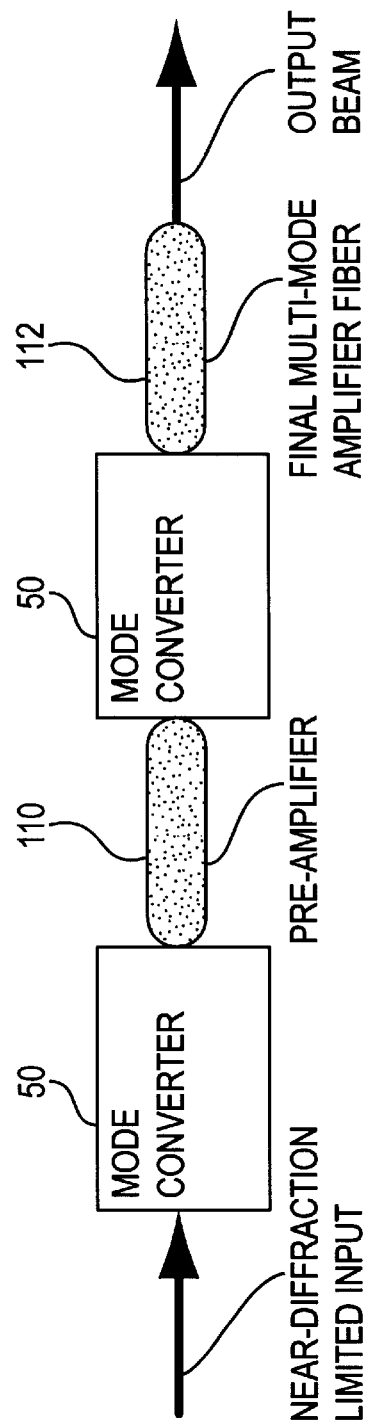
FIG. 11 is a block diagram of a multi-mode fiber amplifier system according to the eighth embodiment of the present invention, wherein a preamplifier is inserted before the multi-mode fiber.

According to an eighth embodiment of the present invention shown in FIG. 11, a preamplifier is included in front of the final MM amplifier fiber 112 to fully saturate the MM amplifier fiber 112 and to reduce the level of ASE in the MM amplifier fiber 112. The preamplifier can be SM and also MM, where it is useful to select the core radius of the preamplifier fiber 110 to be smaller than the core radius of the final MM amplifier fiber 112 to minimize the growth of ASE. One isolator (not shown) can be inserted between the laser source and the preamplifier and another isolator (not shown) can be inserted between the preamplifier 110 and the final MM amplifier fiber 112 further to reduce ASE. Similarly, narrow band optical filters (not shown) can be included anywhere in the system to reduce ASE. Also, optical switches (not shown) can be used in between the laser source, the preamplifier 110 and the final amplifier 112 to reduce the amount of ASE.

More than one preamplifier can be used in the system, where isolators and optical filters and optical switches can be used to minimize the amount of generated ASE in the system. Further, nonlinear processes in the preamplifiers and the final MM amplifier can be used for pulse compression.

Figure 12:
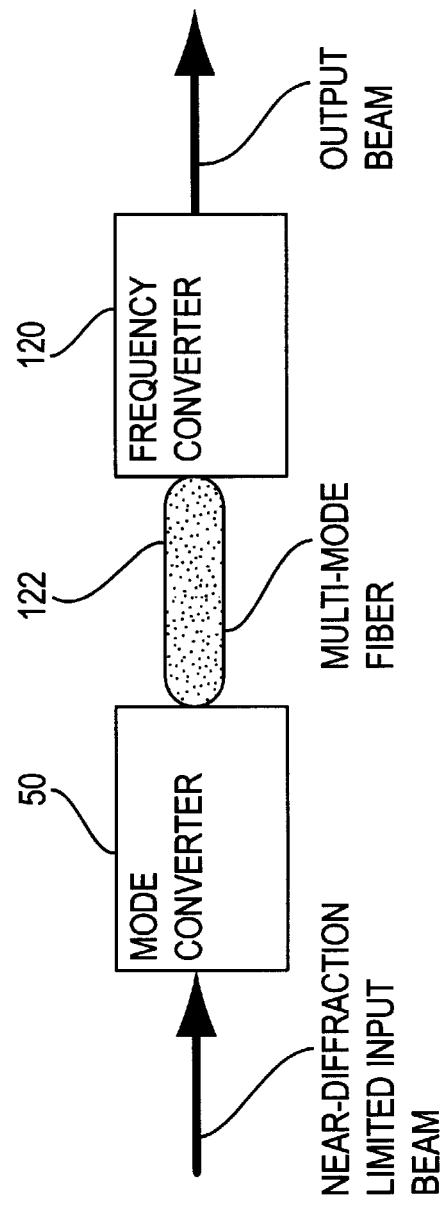
FIG. 12 is a block diagram of a multi-mode fiber amplifier system according to the ninth embodiment of the present invention, wherein a frequency converter is disposed at an output of the multi-mode fiber.

According to a ninth embodiment of the present invention shown in FIG. 12, a frequency converter 120 is included downstream of the MM amplifier fiber 122 to frequency convert the output amplified beam. The frequency converter can be a non-linear crystal, such as a periodically-poled or aperiodically poled LiNbO$_3$ crystal which frequency doubles the output beam.

Although several exemplary embodiments have been herein shown and described, those of skill in the art will recognize that many modifications and variations are possible without departing from the spirit and scope of the invention, and it is intended to measure the invention only by the appended claims.

What is claimed is:

1. An optical amplification system, comprising:
    a laser source generating an input beam having a nearly diffraction limited mode;
    a multi-mode fiber amplifier;
    a mode converter receiving the input beam and converting the mode of the input beam to match a fundamental mode of the multi-mode fiber amplifier, and providing a mode-converted input beam to said multi-mode fiber amplifier; and
    a pump source coupled to said multi-mode fiber amplifier, said pump optically pumping said multi-mode fiber amplifier, said multi-mode fiber amplifier providing at an output thereof an amplified beam substantially in the fundamental mode.

2. The optical amplification system according to claim 1, wherein the fundamental mode is substantially guided by gain-guiding.

3. The optical amplification system according to claim 2, wherein inter-modal scattering from the fundamental mode to any higher-order mode is substantially reduced by gain-guiding of the fundamental mode.

4. The optical amplification system according to claim 2, wherein, as a result of substantial gain-guiding, the size of the fundamental mode in said multi-mode fiber amplifier varies along the fiber length.

5. The optical amplification system according to claim 1, wherein said multi-mode fiber amplifier comprises a fiber core, and wherein a dopant is confined in an area in a central section of the fiber core substantially smaller than a total fiber core area.

6. The optical amplification system according to claim 1, wherein said multi-mode fiber amplifier comprises a fiber core, and wherein a dopant is confined in an area in a central section of the fiber core substantially smaller than a total fiber core area, and wherein mode-coupling into higher-order modes is reduced by gain-guiding.

7. The optical amplification system according to claim 1, wherein a gain of the fundamental mode is substantially higher than a gain of any other mode present in said multi-mode fiber amplifier.

8. The optical amplification system according to claim 1, wherein a size of the fundamental mode in said multi-mode fiber amplifier varies along length of said multi-mode fiber amplifier in accordance with a change in fiber diameter along the length of said multi-mode fiber.

9. The optical amplification system according to claim 1, wherein a size of the fundamental mode in said multi-mode fiber amplifier varies along a length of said multi-mode fiber amplifier in accordance with a change in a core or doped core diameter along the length of said multi-mode fiber.

10. The optical amplification system according to claim 1, wherein said multi-mode fiber amplifier is doped with rare-earth-ions.

11. The optical amplification system according to claim 1, wherein said multi-mode fiber amplifier is doped with at least one of: Er, Er/Yb, Yb, Nd, Tm, Pr, Ho ions.

12. The optical amplification system according to claim 1, wherein said multi-mode fiber amplifier comprises a double cladding structure.

13. The optical amplification system according to claim 1, wherein said multi-mode fiber amplifier is polarization maintaining.

14. The optical amplification system according to claim 1, wherein the amplified beam passes through said multi-mode fiber amplifier at least twice.

15. The optical amplification system according to claim 1, wherein the mode-converted input beam comprises optical pulses, wherein nonlinear effects within said multi-mode fiber amplifier broaden a spectrum of the optical pulses.

16. The optical amplification system according to claim 1, wherein the mode-converted input beam comprises optical pulses, the system further comprising a compressor which compresses the optical pulses output from said multi-mode fiber amplifier.

17. The optical amplification system according to claim 1, wherein said mode converter comprises a bulk-optics imaging system.

18. The optical amplification system according to claim 1, wherein said mode converter comprises a tapered single-mode fiber.

19. The optical amplification system according to claim 1, wherein said mode converter comprises a combination of a bulk-optics imaging system and a tapered fiber.

20. The optical amplification system according to claim 1, further comprising:
    reflectors disposed to form a laser cavity, said reflectors reflecting energy of the amplified beam along an axis; and
    means for coupling the reflected energy of the amplified beam out of the laser cavity.

21. The optical amplification system according to claim 20, wherein said reflectors comprise at least one of: a mirror; a fiber Bragg grating; and a bulk grating.

22. The optical amplification system according to claim 20, further comprising an optical switch disposed within the laser cavity, said optical switch enabling Q-switching of the laser cavity.

23. The optical amplification system according to claim 20, further comprising an optical switch disposed within the laser cavity, said optical switch enabling operation of the laser cavity as a regenerative amplifier.

24. The optical amplification system according to claim 1, further comprising a mode filter receiving the amplified beam and providing a mode-filtered beam.

25. The optical amplification system according to claim 24, wherein said mode filter is a single mode fiber.

26. The optical amplification system according to claim 24, wherein said mode filter is a spatial filter.

27. The optical amplification system according to claim 1, wherein a number of propagating modes within said multi-mode fiber amplifier is between 3 and 3000.

28. The optical amplification system according to claim 1, wherein a number of propagating modes within said multi-mode fiber amplifier is between 3 and 1000.

29. The optical amplification system according to claim 1, wherein a wavelength of the amplified beam is greater than 1.100 $\mu$m.

30. The optical amplification system according to claim 1, wherein said multi-mode fiber is disposed along a straight line and tension is applied along a longitudinal direction of said multi-mode fiber amplifier.

31. The optical amplification system according to claim 1, wherein said multi-mode fiber has a step-index refractive index profile.

32. The optical amplification system according to claim 1, wherein said multi-mode fiber amplifier is manufactured by one of: MCVD, OVD, VAD and PCVD fabrication techniques.

33. The optical amplification system according to claim 1, wherein a number of propagating modes within said multi-mode fiber amplifier is higher than 4, and wherein a fiber Bragg grating is written into said multi-mode fiber amplifier.

34. The optical amplification system according to claim 1, wherein a chirped fiber Bragg grating is written into said multi-mode fiber amplifier.

35. The optical amplification system according to claim 1, wherein said laser source comprises a single-mode fiber oscillator.

36. The optical amplification system according to claim 1, wherein at least one pre-amplifier is inserted between said laser source and said multimode fiber amplifier.

37. The optical amplification system according to claim 36, wherein said at least one pre-amplifier is a second multi-mode amplifier fiber, and wherein a single mode is launched into said multi-mode amplifier fiber.

38. The optical amplification system according to claim 36, wherein said at least one pre-amplifier is a single-mode amplifier fiber.

39. The optical amplification system according to claim 1, wherein said multi-mode fiber amplifier generates pulses with a peak power greater than 1 kW.

40. The optical amplification system according to claim 1, wherein said multi-mode fiber amplifier generates a peak power greater than a ratio of 1 kW/amplifier length.

41. The optical amplification system according to claim 1, wherein optical pulses having a width shorter than 10 nsec are amplified in said multi-mode fiber.

42. The optical amplification system according to claim 1, further comprising a nonlinear optical element disposed downstream of said multi-mode fiber amplifier, wherein said amplified beam is frequency converted by said nonlinear optical element.

43. The optical amplification system according to claim 1, further comprising a nonlinear crystal disposed downstream of said multi-mode fiber amplifier, wherein said amplified beam is frequency doubled in said nonlinear crystal.

44. The optical amplification system according to claim 43, wherein said nonlinear crystal comprises a periodically-poled $LiNbO_3$ crystal.

45. The optical amplification system according to claim 43, wherein said nonlinear crystal comprises an aperiodically-poled $LiNbO_3$ crystal.

46. The optical amplification system according to claim 1, wherein an $M^2$-value of said multi-mode fiber amplifier is less than 10.

47. The optical amplification system according to claim 1, wherein an $M^2$-value of said multi-mode fiber amplifier is less than 4.

48. The optical amplification system according to claim 1, wherein an $M^2$-value of said multi-mode fiber amplifier is less than 2.

49. The optical amplification system according to claim 1, wherein said multi-mode fiber amplifier comprises a cladding with an outside diameter greater than 125 $\mu$m.

* * * * *

(12) EX PARTE REEXAMINATION CERTIFICATE (7121st)
United States Patent
Fermann et al.

(10) Number: US 5,818,630 C1
(45) Certificate Issued: Oct. 27, 2009

(54) SINGLE-MODE AMPLIFIERS AND COMPRESSORS BASED ON MULTI-MODE FIBERS

(75) Inventors: Martin E. Fermann, Ann Arbor, MI (US); Donald J. Harter, Ann Arbor, MI (US)

(73) Assignee: Imra America, Inc., Ann Arbor, MI (US)

Reexamination Request:
No. 90/008,971, Mar. 12, 2008

Reexamination Certificate for:
Patent No.: 5,818,630
Issued: Oct. 6, 1998
Appl. No.: 08/882,349
Filed: Jun. 25, 1997

(51) Int. Cl.
*H01S 3/06* (2006.01)
*H01S 3/067* (2006.01)
*H01S 3/094* (2006.01)
*H01S 3/08* (2006.01)
*H01S 3/23* (2006.01)
*G02F 1/35* (2006.01)
*G02F 1/37* (2006.01)

(52) U.S. Cl. .................. 359/341.31; 359/340; 372/19; 398/143

(58) Field of Classification Search .................. None
See application file for complete search history.

(56) References Cited

U.S. PATENT DOCUMENTS

| | | |
|---|---|---|
| 3,308,394 A | 3/1967 | Snitzer |
| 3,350,654 A | 10/1967 | Snitzer |
| 3,355,674 A | 11/1967 | Hardy |
| 3,395,366 A | 7/1968 | Snitzer |
| 3,599,106 A | 8/1971 | Snitzer |

(Continued)

FOREIGN PATENT DOCUMENTS

DE 2844129 A1 4/1980

(Continued)

OTHER PUBLICATIONS

Griebner et al. Efficient Laser Operation with Nearly diffraction–limited output from a diode–pumped heavily doped Nd–doped multimode fiber. Optics Letters. vol. 21. No. 4. Feb. 15, 1996.*

(Continued)

*Primary Examiner*—Deandra M Hughes

(57) ABSTRACT

To amplify and compress optical pulses in a multi-mode (MM) optical fiber, a single-mode is launched into the MM fiber by matching the modal profile of the fundamental mode of the MM fiber with a diffraction-limited optical mode at the launch end. The fundamental mode is preserved in the MM fiber by minimizing mode-coupling by using relatively short lengths of step-index MM fibers with a few hundred modes and by minimizing fiber perturbations. Doping is confined to the center of the fiber core to preferentially amplify the fundamental mode, to reduce amplified spontaneous emission and to allow gain-guiding of the fundamental mode. Gain-guiding allows for the design of systems with length-dependent and power-dependent diameters of the fundamental mode. To allow pumping with high-power laser diodes, a double-clad amplifier structure is employed. For applications in nonlinear pulse-compression, self phase modulation and dispersion in the optical fibers can be exploited. High-power optical pulses may be linearly compressed using bulk optics dispersive delay lines or by chirped fiber Bragg gratings written directly into the SM or MM optical fiber. High-power cw lasers operating in a single near-diffraction-limited mode may by constructed from MM fibers by incorporating effective mode-filters into the laser cavity. Regenerative fiber amplifiers may be constructed from MM fibers by careful control of the recirculating mode. Higher-power Q-switched fiber lasers may be constructed by exploiting the large energy stored in MM fiber amplifiers.

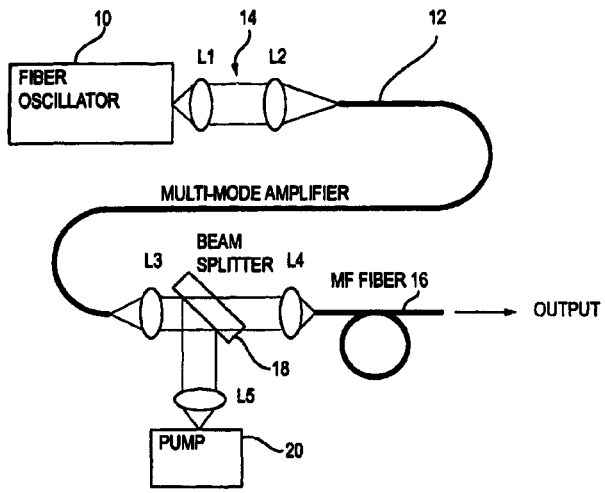

U.S. PATENT DOCUMENTS

| | | |
|---|---|---|
| 3,687,514 A | 8/1972 | Miller |
| 3,729,690 A | 4/1973 | Snitzer |
| 3,761,716 A | 9/1973 | Kapron |
| 3,777,149 A | 12/1973 | Marcatill |
| 3,779,628 A | 12/1973 | Kapron |
| 3,808,549 A | 4/1974 | Maurer |
| 3,826,992 A | 7/1974 | Friedl |
| 3,859,073 A | 1/1975 | Schultz |
| 3,973,828 A | 8/1976 | Onoda |
| 4,050,782 A | 9/1977 | Uchida |
| 4,120,587 A | 10/1978 | Vali |
| 4,204,745 A | 5/1980 | Sakai |
| 4,260,221 A | 4/1981 | Marcuse |
| 4,447,125 A | 5/1984 | Lazay |
| 4,465,334 A | 8/1984 | Siemsen |
| 4,504,111 A | 3/1985 | Hunzinger |
| 4,515,431 A | 5/1985 | Shaw |
| 4,546,476 A | 10/1985 | Shaw et al. |
| 4,553,238 A | 11/1985 | Shaw |
| 4,554,510 A | 11/1985 | Shaw |
| 4,556,279 A | 12/1985 | Shaw |
| 4,560,234 A | 12/1985 | Shaw |
| 4,603,940 A | 8/1986 | Shaw |
| 4,637,025 A | 1/1987 | Snitzer |
| 4,674,830 A | 6/1987 | Shaw |
| 4,680,767 A | 7/1987 | Hakimi |
| 4,708,421 A | 11/1987 | Desurvire |
| 4,712,075 A | 12/1987 | Snitzer |
| 4,723,824 A | 2/1988 | Shaw |
| 4,723,828 A | 2/1988 | Garel-Jones |
| 4,738,503 A | 4/1988 | Desurvire |
| 4,741,586 A | 5/1988 | Kim |
| 4,768,851 A | 9/1988 | Shaw |
| 4,780,877 A | 10/1988 | Snitzer |
| 4,782,491 A | 11/1988 | Snitzer |
| 4,787,927 A | 11/1988 | Mears |
| 4,815,079 A | 3/1989 | Snitzer |
| 4,815,804 A | 3/1989 | Desurvire |
| 4,817,205 A | 3/1989 | Asawa |
| 4,828,350 A | 5/1989 | Kim |
| 4,829,529 A | 5/1989 | Kafka |
| 4,832,437 A | 5/1989 | Kim |
| 4,859,016 A | 8/1989 | Shaw |
| 4,895,421 A | 1/1990 | Kim |
| 4,896,942 A | 1/1990 | Onstott |
| 4,913,520 A | 4/1990 | Kafka |
| 4,923,279 A | 5/1990 | Ainslie |
| 4,938,556 A | 7/1990 | Digonnet |
| 4,944,591 A | 7/1990 | McMichael |
| 4,955,014 A | 9/1990 | Kuppers |
| 4,964,131 A | 10/1990 | Liu |
| 4,991,923 A | 2/1991 | Kino |
| 5,032,001 A | 7/1991 | Shang |
| 5,048,026 A | 9/1991 | Shaw |
| 5,058,976 A | 10/1991 | DiGiovanni |
| 5,067,134 A | 11/1991 | Oomen |
| 5,074,633 A | 12/1991 | Cohen |
| 5,077,483 A | 12/1991 | Cloonan |
| 5,077,815 A | 12/1991 | Yoshizawa |
| 5,095,518 A | 3/1992 | Young |
| 5,108,183 A | 4/1992 | Fling |
| 5,121,460 A | 6/1992 | Tumminelli et al. |
| 5,171,458 A | 12/1992 | Aoyagi |
| 5,175,785 A | 12/1992 | Dabby |
| 5,177,562 A | 1/1993 | Wysocki |
| 5,185,749 A | 2/1993 | Kalman |
| 5,187,759 A | 2/1993 | DiGiovanni et al. |
| 5,189,676 A | 2/1993 | Wysocki |
| 5,226,049 A | 7/1993 | Grubb |
| 5,253,322 A | 10/1993 | Onishi |
| 5,255,274 A | 10/1993 | Wysocki |
| 5,263,036 A | 11/1993 | De Bernardi |
| 5,311,525 A | 5/1994 | Pantell |
| 5,319,652 A | 6/1994 | Moeller |
| 5,321,718 A | 6/1994 | Waarts |
| 5,349,602 A | 9/1994 | Mehuys |
| 5,353,363 A | 10/1994 | Keck |
| 5,363,234 A | 11/1994 | Newhouse |
| 5,363,386 A | 11/1994 | Smith |
| 5,381,431 A | 1/1995 | Zayhowski |
| 5,388,120 A | 2/1995 | Ackley |
| 5,400,350 A | 3/1995 | Galvanauskas |
| 5,416,862 A | 5/1995 | Haas |
| 5,422,897 A | 6/1995 | Wyatt |
| 5,439,602 A | 8/1995 | Eckard |
| 5,450,427 A | 9/1995 | Fermann |
| 5,452,394 A | 9/1995 | Huang |
| 5,488,619 A | 1/1996 | Injeyan |
| 5,494,941 A | 2/1996 | Lutter |
| 5,499,134 A | 3/1996 | Galvanauskas |
| 5,508,845 A | 4/1996 | Frisken |
| 5,511,083 A | 4/1996 | D'Amato |
| 5,513,194 A | 4/1996 | Tamura |
| 5,513,196 A | 4/1996 | Bischel |
| 5,517,525 A | 5/1996 | Endo |
| 5,539,571 A | 7/1996 | Welch |
| 5,541,947 A | 7/1996 | Mourou |
| 5,546,415 A | 8/1996 | Delfyett |
| 5,546,484 A | 8/1996 | Fling |
| 5,553,163 A | 9/1996 | Nivelle |
| 5,559,816 A | 9/1996 | Basting et al. |
| 5,572,618 A | 11/1996 | DiGiovanni |
| 5,627,848 A | 5/1997 | Fermann |
| 5,627,854 A | 5/1997 | Knox |
| 5,659,558 A | 8/1997 | Tohmon |
| 5,659,644 A | 8/1997 | DiGiovanni |
| 5,689,519 A | 11/1997 | Fermann |
| 5,701,318 A | 12/1997 | Digonnet |
| 5,701,319 A | 12/1997 | Fermann |
| 5,774,484 A | 6/1998 | Wyatt |
| 5,818,630 A | 10/1998 | Fermann |
| 5,828,802 A | 10/1998 | Stolen |
| 5,838,702 A | 11/1998 | Byer |
| 5,841,797 A | 11/1998 | Ventrudo |
| 5,844,927 A | 12/1998 | Kringlebotn |
| 5,854,865 A | 12/1998 | Goldberg |
| 5,861,970 A | 1/1999 | Tatham |
| 5,862,287 A | 1/1999 | Stock |
| 5,867,305 A | 2/1999 | Waarts |
| 5,880,877 A | 3/1999 | Fermann |
| 5,887,009 A | 3/1999 | Mandella |
| 5,905,745 A | 5/1999 | Grubb |
| 5,923,684 A | 7/1999 | DiGiovanni |
| 5,953,353 A | 9/1999 | Headley |
| 5,966,491 A | 10/1999 | DiGiovanni |
| 5,974,060 A | 10/1999 | Byren |
| 5,993,899 A | 11/1999 | Robin |
| 5,999,673 A | 12/1999 | Valentin |
| 6,031,849 A | 2/2000 | Ball |
| 6,034,975 A | 3/2000 | Harter |
| 6,044,188 A | 3/2000 | Kropp |
| 6,064,786 A | 5/2000 | Cunningham |
| 6,072,811 A | 6/2000 | Fermann |
| 6,081,369 A | 6/2000 | Waarts |
| 6,097,741 A | 8/2000 | Lin |
| 6,104,733 A | 8/2000 | Espindola |
| 6,141,143 A | 10/2000 | Marshall |
| 6,157,763 A | 12/2000 | Grubb |
| 6,185,346 B1 | 2/2001 | Asawa |
| 6,188,705 B1 | 2/2001 | Krainak |
| 6,212,216 B1 | 4/2001 | Pillai |

| | | |
|---|---|---|
| 6,236,498 B1 | 5/2001 | Freeman |
| 6,236,793 B1 | 5/2001 | Lawrence |
| 6,249,630 B1 | 6/2001 | Stock |
| 6,275,512 B1 | 8/2001 | Fermann |
| 6,295,161 B1 | 9/2001 | Bazzocchi |
| 6,301,271 B1 | 10/2001 | Sanders |
| 6,304,352 B1 | 10/2001 | Cunningham |
| 6,320,885 B1 | 11/2001 | Kawai |
| 6,324,326 B1 | 11/2001 | Dejneka |
| 6,327,403 B1 | 12/2001 | Danziger |
| 6,356,680 B1 | 3/2002 | Kirk |
| 6,373,867 B1 | 4/2002 | Lin |
| 6,415,076 B1 | 7/2002 | DeCusatis |
| 6,427,491 B1 | 8/2002 | Burke |
| 6,434,311 B1 | 8/2002 | Danziger |
| 6,487,338 B2 | 11/2002 | Asawa |
| 6,496,301 B1 | 12/2002 | Koplow |
| 6,501,884 B1 | 12/2002 | Golowich |
| 6,510,265 B1 | 1/2003 | Giaretta |
| 6,567,583 B2 | 5/2003 | Mettler |
| 6,574,406 B2 | 6/2003 | Ainslie |
| 6,738,186 B2 | 5/2004 | Jiang |
| 6,751,388 B2 | 6/2004 | Siegman |
| 6,771,856 B2 | 8/2004 | Ralph |
| 6,885,682 B2 | 4/2005 | Fuse |
| 6,885,683 B1 | 4/2005 | Fermann |
| 6,904,219 B1 | 6/2005 | Fermann |
| 6,954,575 B2 | 10/2005 | Fermann |
| 6,956,887 B2 | 10/2005 | Jiang |
| 6,987,783 B2 | 1/2006 | Fajardo |
| 7,043,126 B2 | 5/2006 | Guan |
| 7,043,128 B2 | 5/2006 | DiGiovanni |
| 7,212,745 B2 | 5/2007 | Numata |
| 7,228,032 B2 | 6/2007 | Blauveit |
| 7,231,114 B2 | 6/2007 | Jenkins |
| 7,242,870 B2 | 7/2007 | Guan |
| 7,248,762 B2 | 7/2007 | Hallemeier |
| 2001/0024458 A1 | 9/2001 | Fermann |
| 2003/0202547 A1 | 10/2003 | Fermann |
| 2004/0213302 A1 | 10/2004 | Fermann |
| 2005/0008044 A1 | 1/2005 | Fermann |
| 2005/0069269 A1 | 3/2005 | Libori |

FOREIGN PATENT DOCUMENTS

| | | |
|---|---|---|
| DE | 19635919 A1 | 3/1997 |
| DE | 198 28 154 A1 | 1/1999 |
| EP | 208189 A2 | 6/1987 |
| EP | 103382 B1 | 9/1989 |
| EP | 704944 A1 | 4/1996 |
| EP | 569174 B1 | 7/1996 |
| EP | 01662624 A1 | 5/2006 |
| FR | 2441858 | 6/1980 |
| JP | 54121749 A | 9/1979 |
| JP | 61065208 | 4/1986 |
| JP | 61233314 A | 10/1986 |
| JP | 62-54986 | 3/1987 |
| JP | 63034521 | 2/1988 |
| JP | 3253243 A | 11/1991 |
| JP | 4253003 | 9/1992 |
| JP | 4273187 | 9/1992 |
| JP | 4322228 | 11/1992 |
| JP | 4507299 | 12/1992 |
| JP | 6059150 A | 3/1994 |
| JP | 7245439 | 9/1995 |
| JP | 8018137 | 1/1996 |
| JP | H8-228038 A | 3/1996 |
| JP | 08-304857 | 11/1996 |
| JP | H8-340141 A | 12/1996 |
| JP | 2002-323636 | 11/2002 |
| JP | 2005-203809 | 7/2005 |
| WO | WO08705118 A1 | 8/1987 |
| WO | WO08910332 A1 | 11/1989 |
| WO | 9315536 | 8/1993 |
| WO | 96/26458 | 8/1996 |
| WO | WO97-21124 A1 | 6/1997 |
| WO | WO09726571 A2 | 7/1997 |
| WO | WO09842050 A1 | 9/1998 |
| WO | 200169313 | 9/2001 |

OTHER PUBLICATIONS

Johnston, T.F. Jr., "M2 concept characterizes beam quality", Laser Focus World, May 1990, p. 173–183.*

B. Desthieux et al., "111 kW (0.5 mJ) pulse amplification at 1.5 μm using a gated cascade of three erbium–doped fiber amplifiers", *Applied Physics Letters*, vol. 63, No. 5, pp. 586–588 (Aug. 1993).

Michel J.F. Digonnet, "Passive and Active Fiber Optic Components", *A Stanford University Ph.D dissertation* (Sep. 1983).

W.A. Gambling et al., "Pulse Dispersion for Single–Mode Operation of Multimode Cladded Optical Fibres", *Electronics Letters*, vol. 10, pp. 148–149 (Mar. 1974).

Z. Haas et al. "A Mode–Filtering Scheme for Improvement of the Bandwidth–Distance Product in Multimode Fiber Systems", *Journal of Lightwave Technology*, vol. 11, No. 7, pp. 1125–1131 (Jul. 1993).

J.D. Minelly et al., "Cladding–pumped fiber laser / amplifier system generating 100 μJ energy picosecond pulses", *Conference on Lasers and Electro–Optics*, vol. 11 of 1997 OSA Technical Digest Series, Conference Edition (Optical Society of America, Washington D.C., 1997), p. 475–476 (May 1997).

John M. Senior, "Optical Fiber Communications: Principles and Practice", Prentice/Hall International, Inc., London, pp. 41–42; 73–76; 138–144 (1985).

Lih–Mei Yang, "Generation and Amplification of Ultrashort Pulses in Erbium, Neodymium, and Thulium Fibers", *A University of Michigan Ph.D. dissertation* (Oct. 1996).

Valentin P. Gapontsev et al; "3W Saturation Power Polarisation Maintaining 1060nm Ytterbium Fiber Amplifier", SPIE, vol. 3815, Nov. 2, 2006, pp. 264–268.

Martin E. Fermann, "Amended Appeal Brief Submitted in Response to notification of Non–Compliant Appeal Brief Dated Mar. 24, 2008", Sep. 23, 2008, pp. 1–123, in U.S. Appl. No. 09/785,944.

Martin E. Fermann, Final Office Action, Jun. 7, 2007, pp. 1–20, in U.S. Appl. No. 09/785,944.

"Advanced and Proven Technology", IRE–Polus Group, No. 5455, 1996, pp. 1–5.

"Pulsed Ytterbium Fiber Laser", Model YLPM–3000, IRE–Polus Group, No. 5455, 1996, pp. 1–2.

"Pulsed Single Mode Ytterbium Fiber Laser", YLP–Series, IRE–Polus Group, No. 5455, 1996, pp. 1–2.

"High Power Single–Mode CW Ytterbium Fiber Laser Module", Model PYL–8000M–1047, IRE–Polus Group, No. 5455, 1996, pp. 1–2.

"High Power Single–Mode CW Ytterbium Fiber Laser Module", Model PYL–5000M, IRE–Polus Group, No. 5455, 1996, pp. 1–2.

"Single–Mode Ytterbium Fiber Laser", Model YLD–2000–1030, IRE–Polus Group, No. 5455, 1996, pp. 1–2.

"Single–Mode Ytterbium Fiber Laser Module", Model YLM–1000A–1030 (1047), IRE–Polus Group, No. 5455, 1996, pp. 1–2.

"Single–Mode High Power Ytterbium Fiber Lasers", PYL–Series, IRE–Polus Group, No. 5455, 1996, pp. 1–2.

"Single–Mode Ytterbium Fiber Laser", Model YL–Series, IRE–Polus Group, No. 5455, 1996, pp. 1–3.

"Tunable ErbiumFiber Laser", Model ELT–100, IRE–Polus Group, No. 5455, 1996, pp. 1–2.

"Single–Frequency Erbium Fiber Laser", Model ELD–500BC, IRE–Polus Group, No. 5455, 1996, pp. 1–2.

"Single–Mode CW Erbium Fiber Laser", Model ELD–5000, IRE–Polus Group, No. 5455, 1996, pp. 1–2.

"Single–Mode Eribum Fiber Laser", EL–Series, IRE–Polus Group, No. 5455, 1996, pp. 1–3.

"Eye–Safe" Pulsed Erbium Fiber Laser, (Bench–Top Version) Model ELPD–1000R, IRE–Polus Group, No. 5455, 1996, pp. 1–2.

"Eye–Safe" Pulsed Erbium Laser Module, Model ELPM–500R, IRE–Polus Group, No. 5455, 1996, pp. 1–2.

"Diode–Pumped Pulsed Erbium Fiber Laser", Model ELPD–100M "Eye–Safe", IRE–Polus Group, No. 5455, 1996, pp. 1–2.

"Pulsed Erbium Fiber Laser", Model ELPD–100LF, IRE–Polus Group, No. 5455, 1996, pp. 1–2.

"Eye–Safe" Pulsed Erbium Fiber Laser, Model ELPD–1000, IRE–Polus Group, No. 5455, 1996, pp. 1–2.

"Pulsed Erbium Fiber Laser", Model ELPD–200HF, IRE–Polus Group, No. 5455, 1996, pp. 1–2.

Alcock et al., "Continuous–wave oscillation of a monomode neodymium–doped fibre laser 0.9 μm on the 4 F 32–4 1 9/2 transition," Optics Communications, 58(6); 405–408 (Jul. 15, 1996).

Alcock et al., "Mode–locking of a neodymium–doped monomode fibre laser," Electronics Letters, 22(5): 268–269 (Feb. 27, 1986).

Alcock et al., "Q–switched operation of a neodymium–doped monomode fibre laser," Electronics Letters, 22(2): 84–85 (Jan. 16, 1986).

Arbore et al., "Frequency doubling of femtosecond erbium–fiber soliton lasers in periodically poled lithium niobate," Optics Letters, 22(1): 13–15 (Jan. 1, 1997).

Berdague et al., "Mode division multiplexing in optical fibers," Applied Optics, 21(11): 1950–1955 (Jun. 1, 1982).

Bergh et al., "All–single–mode fiber–optic gyroscope with long–term stability," Optics Letters, 6(10): 502–504 (Oct. 1981).

Bergh et al., "An overview of fiber–optic gyroscopes," Journal of Lightwave Technology, LT–2(2): 91–107 P103 (Apr. 1984).

Cordova–Plaza, et al., "Low threshold miniature Q–switched Nd:MgO:LINbO3 laser," OSA Annual Meeting: Digest of Technical Papers and Postdeadline Papers FD6 (Oct. 1986).

Dennis et al., "2–W upconversion laser in Tm:ZBLAN fiber," CLEO Technical Digest, 8: 41 (May 9, 1994).

Desthieux et al., "111kW (0.5mJ) pulse amplification at 1.5 m using a gated cascade of three erbium–doped fiber amplifiers" Appl. Phys. Lett., 63(5): 586–588 (Aug. 2, 1993).

Desurvire et al., "Low–threshold synchronously pumped all–fiber ring raman laser," Journal of Lightwave Technology LT–5(1): 89–96 (Jan. 1987).

Digonnet et al., "1.064– and 1.32–um Nd:YAG Single Crystal Fiber Lasers," Journal of Lightwave Technology, LT–4(4): 454–460 (Apr. 1986).

Digonnet et al., "Clad Nd:YAG fibers for laser applications," Journal of Lightwave Technology, LT–5(5): 642–646 (May 1987).

Digonnet, "Passive and Active fiber optic components," Dissertation (Sep. 1983).

Eisenstein et al., "High–power extended–cavity laser at 1.3 μm with a single–mode fiber output port," Appl. Phys. Lett, 50(22): 1567–1568 (Jun. 1, 1987).

Fermann et al., "Fiber–lasers for ultrafast optics," Applied Physics B: Lasers and Optics, B 65(2): 259–275 (Aug. 1997).

Fermann et al., "Frequency doubling of Er–doped multi–mode fiber compressor–amplifiers," CLEO Technical Digest, 6: 189–190 (May 5, 1998).

Fermann et al., "High–power single–mode fiber amplifers using multimode fibers" OFC Technical Digest, 2: 39–40 (Feb. 1998).

Fermann et al., "Ultrawide Tunable Er Soliton Fiber Laser Amplified in Yb–Doped Fiber," Optics Letters, 24 (20): 1428–1430 (Oct. 15, 1999).

Galvanauskas et al., "Fiber–laser–based femtosecond parametric generators and amplifiers," CLEO Technical Digest, 344–345 (May 22, 1997).

Galvanauskas et al., "High–energy high–average–power femtosecond fiber system using a QPM–grating pulse compressor," CLEO Technical Digest, 6: 364 (May 7, 1998).

Gambling et al., "Pulse dispersion for single–mode operation of multimode cladded optical fibres," Electronics Letters, 10 (Mar. 27, 1974).

Gambling, et al., "Mode conversion coefficients in optical fibers," Applied Optics, 14(7): 1538–1542 (Jul. 1975).

Gapontsev et al., "kW peak power, wide–tuneable–repetition–rate and pulse duration eye–safe MOPFA laser," CLEO Technical Digest, 209–210 (May 1996).

Giles et al., "Modeling erbium–doped fiber amplifiers," Journal of Lightwave Technology, 9(2): 271–283 (Feb. 1991).

Gloge, "Optical power flow in multimode fibers," Bell System Technical Journal, 51(8): 1767–1783 (Oct. 1972).

Griebner et al., "Efficient laser operation with nearly diffraction–limited output from a diode–pumped heavily Nd–doped multimode fiber," Optics Letters, 21(4): 266–268 (Feb. 15, 1996).

Haas et al., "A mode–filtering scheme for improvement of the bandwidth–distance product in multimode fiber systems," Journal of Lightwave Technology, 11(7): 1125–1131 (Jul. 1993).

Harter et al., "Alexandrite–laser–pumped Cr 3+:LiSrAlF6," Optics Letters, 17(21): 1512–1514 (Nov. 1, 1992).

ISO 11146–1, "Lasers and laser–related equipment Test methods for laser beam widths, divergence angles and beam propagation ratios—Part 1: Stigmatic and simple astigmatic beams" (2005).

Jauncey et al., "Efficient diode–pumped CW and Q–switched single–mode fibre laser," Electronics Letters, 22(4): 198–199 (Feb. 13, 1986).

Johnston, "M2 concept characterizes beam quality," Laser Focus World, 173–183 (May 1990).

Keck, Spatial and temporal power transfer measurements on a low–loss optical waveguide, Applied Optics, 13(8): 1882–1888 (Aug. 1974).

Koester et al., "Amplification in a fiber laser," Applied Optics, 3(10): 1182–1186 (Oct. 1964).

Koplow et al., "Single-mode operation of a coiled multimode fiber amplifier," Optics Letters, 25(7): 442–444 (Apr. 1, 2000).

Lee et al., "Simple side coupler for coupling between laser diode and single-mode optical fiber," Applied Optics, 26(12): 2294–2296 (Jun. 15, 1987).

Luther-Davies et al., "Single-mode resonator incorporating an internal multimode optical fiber and a phase-conjugate reflector," Josa B: Optical Physics, 7(7): 1216–1220 (Jul. 1990).

Marcuse, D., Theory of Dielectric Optical Waveguides, Academic Press, Inc., New York and London, pp. 238–239 (1974).

Minelly et al., "Cladding-pumped fiber laser/amplifier system generating 100 µj energy picosecond pulses," CLEO Technical Digest, 475–476 (May 23, 1997).

Morkel et al. "Theoretical modeling of erbium-doped fiber amplifiers with excited-state absorption," Optics Letters, 14(19): 1062–1064 (1989).

Nakano et al., "Partially coherent light generated by using single and multimode optical fibers in a high-power Nd:glass laser system," Applied Physics Letters, 63(5): 580–582 (1993).

Nelson et al., "Efficient frequency doubling of a femtosecond fiber laser," Optics Letters, 21(21): 1759–1761 (Nov. 1996).

Nilsson et al., "Yb 3+-ring-doped fiber for high-energy pulse amplification," Optics Letters, 22(14): 1092–1094 (Jul. 1997).

Nisoli et al., "Generation of high-energy 10-fs pulses by a new pulse compression technique," CLEO Technical Digest, 9: 189–190 (Jun. 1996).

Nykolak et al., "An Erbium-doped Multimode optical fiber amplifier," Photonics Technology Letters, 3(12): 1079–1081 (Dec. 1991).

Olshansky, R., "Distortion losses in cabled optical fibers," Applied Optics, 14(1): 20–21 (Jan. 1975).

Olshansky, R., "Mode coupling effects in graded-index optical fibers," Applied Optics, 14(4): 935–945 (Apr. 1975).

Poole et al., "Fabrication of low-loss optical fibres containing rare-earth ions," Electronics Letters, 21(17): 737–738 (Aug. 1985).

Ripin et al., "High efficiency side-coupling of light into Optical fibers using imbedded V-Groves," Electronics Letters, 31(25): 2204–2205 (1995).

Senior, J. Optical Fiber Communications: Principles and Practices, Prentice/Hall International pp. 41–42, 73–76, 138–144 (1985).

Shaklan, S., "Measurement of Intermodel coupling in weakly multimode fibre optics," Electronics Letters, 26(24): 2022–2024 (Nov. 1990).

Siegman, A.E., "Defining, measuring, and optimizing laser beam quality," SPIE, 1868: 2–12.

Sousa et al., "Multimode Er-doped fiber for single-transverse-mode amplification," Applied Physics Letters, 74(11): 1528–30 (Mar. 1999).

Spielmann et al., "Ultrabroadband femtosecond lasers," IEEE J. Quantum Electronics, 30(4): 1100–1114 (Apr. 1994).

Tajima, "Er3+-Doped single-polarisation optical fibres," Electronics Letters, 26(18): 1498–1499 (Aug. 30, 1990).

Walton et al., "Broad-bandwidth pulse amplification to the 10-J level in an ytterbium-doped germanosilicate fiber," Optics Letters, 21(14): 1061–1063 (Jul. 1996).

Yamada et al., "First-order quasi-phase matched LiNbO3 waveguide periodically poled by applying an external field for efficient blue second-harmonic generation," Appl. Phys. Lett. 62(5): 435–436 (Feb. 1993).

Yang, Lih-Mei, "Generation and Amplification of Ultrashort Pulses in Eriblum Neodymium and Thulium Fibers," UMI Dissertation Abstracts (1996).

Yang et al., "Upconversion chirping pulse amplification of ultrashort pulses using a multimode Tm:2BLAN fiber," SPIE, 2377: 148–156 (Jun. 1995).

Encyclopedia of Laser Physics and Technology, http://www.rp-photonics.com/fiber_coupled_diode_lasers.html, accesed Nov. 21, 2007.

Berdague et al., "Mode division multiplexing in optical fibers." Applied Optics. 21(11). 1950–1955 (Jun. 1, 1982).

Desthieux et al., "Generation of 111kW (0.5mJ) Pulses at 1.5mm Using a Gated Cascade of Three Fibre Amplifiers." p.2.13 329–332 (1990).

Desurvire et al., "Design optimization for efficient erbium-doped fiber amplifiers," Journal of Lightwave Technology, 8(11): 1730–1740 (Nov. 1990).

Digonnet et al , "Nd: YAG single crystal fiber lasers," Second European Conference on Integrated Optics (Oct. 1983).

Dominic et al., "110 W fiber laser," *Technical Digest: CLEO*, CPD11–1–CPD11–2 (May 23–28, 1999).

Fermann et al , "Cladding-Pumped Passively Mode-locked femtosecond fiber lasers." CLEO, CFD1: 493–494 (1996).

Fermann et al., "Environmentally stable Kerr-type mode-locked erbium fiber laser producing 360-fs pulses," Optics Letters, 19(1): 43–45 (Jan. 1. 1994).

Fermann et al., "Fiber-lasers for ultrafast optics" Applied Physics B, 63(2): 259–275 (Aug. 1997).

Fermann et al., "Ultrafast pulse sources based on mult-mode optical fibers," Applied Physics B, 70 [Suppl.]: S13–S23 (2000).

Fermann, "Single-mode excitation of multimode fibers with ultrashort pulses," Optics Letters, 23(1): 52–54 (Jan. 1, 1998).

Gambling et al., "Mode Excitation in a multimode optical-fibre waveguide," Electronics Letters. 9(18): 412–414 (Sep. 6, 1973).

Gapontsev et al., "3W saturation power polarisation maintaining 1060 nm ytterbium fiber amplifier," SPIE. 3615: 264–268 (Jan. 1999).

Hofer et al., "Characterization of Ultrashort Pulse Formation in Passively Mode-Locked Fiber Lasers," IEEE J. of Quantum Electronics, 28(3): 720–728 (Mar. 1992).

Imasaka, "Optical Chromatography. A new tool for separation of particles." Analusis Magazine, 26(5): M 53–M 55 (1998).

IPG Manual, Draft Specification: Ytterbium pulsed fiber laser Model YLP—10/400/20/200. IPG Lasers.

Jedrzeewski et al., "Tapered-Beam Expander for Single-Mode Optical-Fiber Gap Devices," Electronics Letters. 22(2): 105–106 (Jan. 1986).

Kaiser, P. & D. Keck, selection from Optical Fiber Telecommunications II, 42–45.

Marsico et al., "Laser Welding of lightweight Structural Steel Panels," ICALEO 444–452 (1993).

Mears et al., "Neodymium-doped silica single-mode fibre lasers." Electronics Letter, 21(17): 738–740 (Aug. 15, 1985).

Millar et al., "Single transverse mode operation at 1345 nm wavelength of a diode–laser pumped neodymium–ZBLAN multimode fiber laser," IEEE Photonics Technology Letters, 2(6) 415–417 (Jun. 1990).

Mortimore et al., "Low–Loss Joints between Dissimilar Fibres by Tapering fusion splices," Electronics Letters. 22(6): 316–319 (Mar. 13, 1986).

Nilsson et al., "Modeling and optimization of low–repetition–rate high–energy pulse amplification in cw–pumpsd erbium–doped fiber amplifiers," Optics Letters, 18(24): 2099–2101 (Dec. 15, 1993).

Ober et al., "42–fs pulse generation from a mode–locked fiber laser started with a moving mirror," Optics Letters, 18(5): 367–389 (Mar. 1, 1993).

Ober et al., "Widely tunable femtosecond neodymium fiber laser," Optics Letters, 20(22): 2303–2305 (Nov. 15, 1995).

Offerhaus et al., "High energy single–transverse–mode Q–switched fiber laser based on a multimode large–mode–area erbium–doped fiber," Optics Letters, 23(21): 1683–1685 (Nov. 1, 1998).

O'Neill et al., "High Power High Brightness Industrial Fiber laser Technology." ICALEO (2004).

Opinion rendered for SPI Lasers, Fulbright & Jaworski L.L.P (Mar. 2, 2006).

Overton, "Fiber Laser Forum gets heated," Industrial Laser Solutions.

Poole et al., "Optical Fiber–Based Dispersion Compensation Using Higher Order Modes Near Cutoff," Journal of Lightwave Technology, 12(10): 1746–1758 (Oct. 1994).

Refi et al., "Optical Fibers for Optical Networking," Bell Labs Technical Journal (Lucent Technologies), 246–261 (Jan.–Mar. 1999).

Richardson et al., "Fiber laser systems shine brightly," Laser Focus World, 33(9): 87–96 (Sep. 1997).

Ross, et al., "Optical amplification of 1.06–u in As1–xPx Injection–laser emission," IEEE J. of Quantum Electronics, QE–6(6): 361–366 (Jun. 1970).

Sakaguchi et al., "Power coupling from laser diodes into single–mode fibres with quadrangular pyramid–shaped hemiellipsoidal ends," Electronics Letters, 17(12): 425–426 (Jun. 1981).

Siegman, A.E., "New developments in laser resonators," SPIE, 1224: 2–14 (1990).

Snitzer, "Fibre lasers and dispersion in fibres," First European Electro–Optics Markets Technology Conference, Geneva, Sep. 13–15, 1972, IPC Science and Technology Press: 374–378 (1973).

Snitzer, "Glass Lasers,"Applied Optics, 5(10): 1487–1499 (Oct. 1966).

Snitzer, E., "Proposed fiber cavities for optical masers," JOAP, 32(1): 36–39 (Jan. 1961).

Sorin et al., "Evanescent amplification in a single–mode optical fibre,"Electronics Letters, 19(20): 820–822 (Sep. 1983).

Sorin et al., "Highly selective evanescent modal filter for two–mode optical fibers," Optics Letters, 11(9): 581–583 (Sep. 1986).

Stock et al., "Chirped pulse amplification in an erbium–doped fiber oscillator/erbium–doped fiber amplifier system," Optics Communication. 106: 249–252 (1994).

Stock et al., "Generation of high–power femtosecond optical pulses by chirped pulse amplification in erbium doped fibers," Nonlinear Guided–Wave Phenomena, Technical Digest. 15: PD5–1–PD53 (Sep. 1993).

Stock, "Generation and amplification of Ultrashort pulses in erbium–doped optical fibers," U. of Michigan Dissertation (1994).

Stock et al., "Synchronous mode locking using pump–induced phase modulation." Optics Letters 18(18): 1529–1531 (Sep. 15, 1993).

Stokes et al.,"All–single–mode fiber resonator," Optics Letters, 7(6): 288–290 (Jun. 1982).

Stone et al., "Neodymium–doped silica lasers in end–pumped fiber geometry," Applied Physics Letters. 23(7): 388–389 (Oct. 1973).

Stone et al., "Self–contained LED–Pumped single–crystal Nd: YAG fiber laser," Fiber and Integrated Optics, 2(1): 19–46 (1979).

Strasser et al., "Reflective–mode conversion with UV–induced phase gratings in two–mode fiber," OFC '97 Technical Digest: 348–349 (1997).

Sumida et al., "Lens coupling of laser diodes to single–mode fibers," Journal of Lightwave Technology. LT–2(3): 305–311 (Jun. 1984).

Tamura et al., "Optimization of Filtering in soliton fiber lasers." Photonics Technology Letters, 6(12): 1433–1435 (Dec. 1994).

Taverner et al., "158 μJ pulses from a single–transverse–mode, large–mode–area erbium–doped fiber amplifier," Optics Letters, 22(6): 378–380 (Mar. 1997).

Taverner et al., "Generation of high–energy pulses using a large–mode–area erbium–doped fiber amplifier," CLEO '96 Technical Digest: 496–497 (1996).

Yang et al., "Chirped–pulse amplification of ultrashort pulses using Neodymium– and Erbium–doped fiber amplifiers," Ultrafast Phenomena IX, 197–189 (1994).

Yang et al., "Chirped–pulse amplification of ultrashort pulses with a multimode TM:ZBLAN fiber upconversion amplifier," Optics Letters, 20(9): 1044–1046 (May 1995).

Yang et al., "Upconversion chirping pulse amplification in a multimode Tm:2BLAN fiber and temporally resolved modal analysis," CLEO '95 Techival Digest 6–7 (1995).

Yang et al., "Upconversion Multimode Fiber Amplifier," Ultrafast Pulse 2(2): 1–2 (1995).

Yapp et al., "Hybrid Laser–Arc Pipeline Welding".

YLR—LP Series: 10 to 500W single mode linearly polarized ytterbium fiber lasers, IPG Photonics.

YLR–SM Series: 100kW to 1.5W CW single mode Yb fiber laser systems—Industrial 19 Rack–Mounted Units. IPG Photonics.

Yoda et al., "Beam quality factor of higher order modes in a step–index fiber," Journal of Lightwave Technology, 24(3): 1350–1355 (2006).

Zenteno et al., "Frequency–modulated cavity–dumped Nd–doped fiber laser," Optics Letters, 16(5): 315–317 (Mar. 1, 1991).

Galvanauskas et al.: "Generation of femtosecond optical pulses with nanojoule energy from a diode laser and fiber system," App. Physics Ltrs. 63, (13) p. 1742 1993.

Galvanauskas et al.: "Compact ultrahigh–power laser systems", SPIE vol. 2377, S– 117–126 Apr. 1995.

Lin et al., Colliding–pulse mode–locked lasers using Er–doped fiber and a semiconductor saturable absorber, Hong Lin, CLEO 1995 paper JTuE1.

Mortimore, et al, Low–Loss Joints between Dissimilar Fibres by Tapering Fusion splices, Electronics Letters, vol. 22, No. 6, pp. 316–319, Mar. 13, 1986.

JPH11–334914–IM–072JP – Office Action translation Dec. 15, 2008.

DE19956739.5–54 72DE Office Action translation Feb. 26, 2009.

DE19961376.8–54 134DE Office Action translation Feb. 6, 2009.

DE19861429.2 IM148DE Office Action Translation Mar. 9, 2009.

International Search Report and Written opinion in PCTUS2008074668 dated Jan. 27, 2009—161PCT.

Alvarez–Chavez et al.; "Mode selection in high power cladding pumped fibre lasers with tapered selection", Conf. on Lasers & Electro–Optics Tech. Digest 1999, paper CWE7.

S. Aramarki et al.; "Revised Phase Diagram for the system Al2O3–SiO2", J of the American Ceramic Society vol. 45 Is 5 May 1962 p. 229–242.

Y. Beaudoin et al.; "Ultrahigh–contrast Ti:sapphire/Nd:glass terawatt laser system", Optics Letters, vol. 17, Iss. 12, pp. 865– (1992).

A.L.G. Carter et al.; "Flash–condensation technique for the fabrication of high–phosphorus–content rare–earth–doped fibres", Electronics Letters vol. 28, Is 2,:pp. 2009–2011 Oct. 8, 1992.

M.L. Dennis et al.; 2–W upconversion laser in TM:ZBLAN fiber, Conf. on Lasers & Electro–Optics CLEO Technical Digest vol. 8, 41, 1994.

M.L. Dennis et al.; "Upconversion–pumped thulium–fiber laser at 810 nm", Optical Fiber Communications Conference OFC '94 Technical Digest WK10, 1994.

J.A. Dobrowolski et al.; "Colored filter glasses: an intercomparison of glasses made by different manufacturer", Applied Optics, vol. 16, Iss. 6, pp. 1491–1512 (1977).

E. M. Erbe et al.; "Properties of $Sm_2O_3$–$Al_2O_3$–$SiO_2$ glasses for in vivo applications", in Journal American Ceramic Society 73 (9), p. 2708, 1990.

M.C. Farries et al. "A Samarium Doped Visible Glass Laser Operating at 651 nm", Electronics Letters, vol. 24, p. 709–711 1988.

M.C. Farries et al. "The Properties of the Samarium Fibre Laser", Fiber Laser Sources and Amplifiers, SPIE 1171, p. 271–278 1989.

M.C. Farries et al. "$Samarium^{3+}$–Doped Glass Laser Operating at 651 nm", Electronics Letters vol. 24, No. 11. May 26, 1988 p. 709–711.

M.C. Farries et al. "Spectroscopic and Lasing Characteristics of Samarium doped Glass Fibre", IEE Proceedings vol. 137, Pt. J. No. 5 Oct. 1990 p. 318–322.

M.C. Farries et al. "Very high–rejection optical fibre filters", Electronics Letters vol. 22, Is 21 pp. 1126–1128 Oct. 9, 1986.

A Fotiadi, "Dynamics of All–Fiber Self–Q–switched Ytterbium/Samarium Laser", CLEO 2007 paper CMC4.

Galvanauskaks, "Mode–Scalable Fiber Based Chirped Pulse Amplification Systems", Selected Topics in Quantum Electronics, IEEE Journal on, vol. 7, Issue: 4, Jul./Aug. 2001 pp. 504–517.

D. Gloge, "Weakly Guiding Fibers", Applied Optics vol. 10, No. 10 Oct. 1971.

J.P. Kohli et al.; "Formation and properties of rare earth aluminosilicate glasses", Kohli J.T., Shelby, J.E. Physics and Chemistry of Glasses 32, Is 3 (Jun.), 67–71, 1991.

J.P. Kohli et al.; "Magneto–optical properties of rare earth alumino–silicate glasses", Kohli J.T., Shelby, J.E. Physics and Chemistry of Glasses 32, Is 3 (Jun.), 109–114, 1991.

J.P. Koplow et al.; "Single–mode operation of a coiled multimode fiber amplifier", Optics Letters vol. 25, p. 422– Apr. 2000.

S–K Liaw et al.; "Passive gain–equalized wide–band erbium–doped fiber amplifier using samarium–doped fiber", Photonics Technology Letters, IEEE, vol. 8, Is. 7 pp. 879–881 Jul. 1996.

Marcuse, D., "Theory of Dielectric Optical Waveguides", Academic Press, Inc 1991, Chapter 2.2; Guided Modes of the Optical Fiber, p. 76–79 (1974).

Mortimore et al, "Low–Loss Joints between Dissimilar Fibres by Tapering Fusion Splices," Electronics Letters, 22(6); 316–319 (Mar. 13, 1986).

HR Müller et al.; "Fibers for high–power lasers and amplifiers", Comptes Rendus Physique, vol. 7, Issue 2, Mar. 2006, pp. 154–162.

R.A. Myers et al.; "Effect of Hydrogen Loading on Temperature electric–Field Polling of $SiO_2$–Based Thin–Films on Si", Electronics Letters vol. 31 Iss. 18 pp. 1604–1606 Published: Aug. 31, 1995.

R.A. Myers et al.; "Stable second–order nonlinearity in $SiO_2$–based waveguides on Si using temperature/electric–field polling", Proceedings of SPIE 2289, 158 (1994).

J. Nilsson et al.; "Modeling and optimization of low–repetition–rate high–energy pulse amplifications in cw–pumped erbium–doped fiber amplifiers", Optics Letters, vol. 18 Iss. 24 p. 2099–2101 (Dec. 1993).

T.B. Norris "Femtoscond pulse amplification at 250 kHz with a Ti:sapphire regenerative amplifier and application to contionuum generation," Optics Letters vol. 17, No. 154, p. 1009, Jul. 1992.

R. Paschotta et al.; "Lifetime quenching in Yb–doped fibres", Optics Communications vol. 136, Apr. 1, 1997 p. 375–378.

H. Po et al.; "Double–clad high brightness Nd fiber laser pumped by GaA/As phased array", Proceedings of Optical Fiber Communication '89, Postdeadline paper PD7, 1989.

Reed et al.; "30–FS Pulses Tunable Across the Visible With a 100–Khz Ti–Sapphire Regenerative Amplifier", Optics Letters vol. 20 Is. 6 pp. 605–607 Published: Mar. 15, 1995.

J–K Rhee et al.; "Chirped–pulse amplification of 85–fs pulses at 250 kHz with third–order dispersion compensation by use of holographic transmission gratings", Optics Letters vol. 19 No. 19, Oct. 1, 1994 p. 1550.

C. Rouyer et al.; "Generation of 50–TW femtosecond pulses in a Ti:sapphire/Nd:glass chain", Optics Letters 18 Iss 3, 214–216 (1993).

U.C. Ryu et al.; "In–line gain control of the erbium doped fiber amplifier using samarium doped inner–cladding in the 1.5 μm region", OSA/ Optical Fiber Communication 2000 paper WA4–1.

A. Saissy et al., "Properties of $Sm^{3+}$ ions in Fluorozirconate fiber", Applied Optics vol. 36 No. 24, p. 5931 Aug. 20 1997 (Sm–fluoro–fiber).

J. Sakai et al.; "Bending loss of propagation modes in arbitrary–index profile optical fibers", Applied Optics 17, 1499–1506 1978.

S7010N Material Safety Data Sheet for, Schott AG, Passive Glasses Laser Cativy Materials.

S7010N Property Sheet, Schott AG, Passive Glasses Laser Cativy Materials.

P. Schultz, "Optical Absorption of the Transition elements in Vitreous Silica", J of the American Ceramic Society vol. 57, Is 7 Jul. 1974, p. 309–313.

B. Shiner et al.; "Fibre sources target automotive industry", Opto & Laser Europe, Jan. 7, 2003 article #16625 optics.org.

O. Svelto, "Principles of Lasers", 4th Edition (Translated by D. C. Hanna), p. 480–483 Springer Science and Business Media, Inc. 1998.

L. Tordella et al.; "High repetition rate passively Q–switched $ND^{3+}$:$Cr^{4+}$ all–fibre laser", Electronics Letters vol. 39 (2003) pp. 1307–1308.

R.P. Tumminelli et al.; "Integrated–Optic ND–Glass Laser Fabricated by Flame Hydrolysis Deposition Using Chelates", Optics Letters vol. 16 Iss. 14 pp. 1098–1100 Published: Jul. 5, 1991.

R.P. Tumminelli et al.; "Fabrication of High–Concentrated Rare–Earth Doped Optical Fibers Using Chelates", J. of Lightwave Tech. vol. 8 Is 11 p. 1680–1683 Nov. 1990.

K. Wakasugi et al.; "Preparation of Glasses Containing Rare Earth Oxide by $CO_2$ Laser", J. of the Soc. Of Materials Science, Japan, vol. 55, No. 7, pp. 675–678 Jul. 2006 (In Japanese) (abstract).

M.H. Watanabei et al.; "Fabrication of $Yb_2O_3$–$SiO_2$ core fiber by a new process", Proceedings ECOC 1985, (IOOC–ECOC '85, Venice).

L.M. Yang et al.; "Chirped pulse amplification of ultrashort pulses using neodymium and erbium doped fiber amplifiers," Springer Series in Chemical Physics, Ultrafast Phenomena, IX, printed 1994, pp. 187–189.

H. Zellmer et al.; "Double–Clad Fiber Laser with 30W Output Power," OSA TOPS vol. 16, Optical Amplifiers and Their Applications, 1997, pp. 137–140. paper: FAW18.

H. Zellmer et al.; High–power cw neodymium–doped fiber laser operating at 9.2 W with high beam quality, Optics Letters, vol. 20, No. 6, Mar. 15, 1995, pp. 578–580.

J.E. Townsend, The development of optical fibres doped with rare–earth ions PhD Thesis—Apr. 1990 640T (p. 249–252 are relevant to RE OA Response).

R.P. Tumminelli File History of US07/648726–US05121460.

Non–final Office Action in Ex Parte Reexamination 90/008,971, dated Mar. 30, 2009.

Amendment in Ex Parte Reexamination 90/008,971 under 37 C.F.R. § 1.111, pp. 1–37, with Appendix, Declaration of Dr. Peter C. Schultz and Declaration of Dr. Wayne H. Knox.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–49 is confirmed.

New claims 50–64 are added and determined to be patentable.

*50. An optical amplification system according to claim 1, wherein said mode converter comprises an optical fiber spliced to an input of said multimode fiber.*

*51. The optical amplification system according to claim 50, wherein said spliced fiber comprises a single-mode fiber, and wherein the mode of the single mode fiber is matched to the fundamental mode of said multi-mode amplifier.*

*52. An optical amplification system, comprising:*
*a laser source generating an input beam having a nearly diffraction limited mode;*
*a multi-mode fiber amplifier, said multi-mode fiber amplifier comprising a bent fiber having a bend radius in the range from about 5 cm to 50 cm;*
*a mode converter receiving the input beam and converting the mode of the input beam to match a fundamental mode of the multi-mode fiber amplifier, and providing a mode-converted input beam to said multi-mode fiber amplifier; and*
*a pump source coupled to said multi-mode fiber amplifier, said pump optically pumping said multi-mode fiber amplifier, said multi-mode fiber amplifier providing at an output thereof an amplified beam substantially in the fundamental mode.*

*53. An optical amplification system, comprising:*
*a laser source generating an input beam having a nearly diffraction limited mode;*
*a multi-mode fiber amplifier;*
*a mode converter receiving the input beam and converting the mode of the input beam to match a fundamental mode of the multi-mode fiber amplifier, and providing a mode-converted input beam to said multi-mode fiber amplifier; and*
*a pump source coupled to said multi-mode fiber amplifier, said pump optically pumping said multi-mode fiber amplifier, said multi-mode fiber amplifier providing at an output thereof an amplified beam substantially in the fundamental mode, and wherein said multi-mode fiber amplifier is configured to substantially eliminate mode coupling during propagation of said mode converted beam in said multi-mode fiber amplifier.*

*54. The optical amplification system according to claim 53, wherein said mode coupling couples less than 6% of the fundamental mode to one or more higher order modes.*

*55. An optical amplification system, comprising:*
*a laser source generating an input beam having a nearly diffraction limited mode;*
*a multi-mode fiber amplifier;*
*a mode converter receiving the input beam and converting the mode of the input beam to match a fundamental mode of the multi-mode fiber amplifier, and providing a mode-converted input beam to said multi-mode fiber amplifier;*
*a pump source coupled to said multi-mode fiber amplifier, said pump optically pumping said multi-mode fiber amplifier, said multi-mode fiber amplifier providing at an output thereof an amplified beam substantially in the fundamental mode; and*
*a single mode fiber receiving the amplified beam.*

*56. The optical amplification system according to claim 55, wherein a coupling efficiency between said amplifier and said single mode fiber is about 90%.*

*57. The optical amplification system according to claim 55, wherein said multi-mode amplifier is substantially straight.*

*58. The optical amplification system according to claim 55, wherein said amplifier is configured with a sufficient thickness to limit bend induced mode coupling.*

*59. An optical amplification system, comprising:*
*a laser source generating an input beam having a nearly diffraction limited mode, said laser source comprising a cw fiber laser;*
*a multi-mode fiber amplifier;*
*a mode converter receiving the input beam and converting the mode of the input beam to match a fundamental mode of the multi-mode fiber amplifier, and providing a mode-converted input beam to said multi-mode fiber amplifier; and*
*a pump source coupled to said multi-mode fiber amplifier, said pump optically pumping said multi-mode fiber amplifier, said multi-mode fiber amplifier providing at an output thereof an amplified beam substantially in the fundamental mode.*

*60. The optical amplification system according to claim 59, wherein said cw fiber laser comprises a multi-mode fiber amplifier.*

*61. The optical amplification system according to claim 59, wherein said cw fiber laser comprises an intracavity mode filter.*

*62. The optical amplification system according to claim 59, further comprising at least one pre-amplifier disposed between said source and said multi-mode fiber amplifier.*

*63. The optical amplification system according to claim 62, wherein a core radius of said pre-amplifier is smaller than a radius of said multimode fiber amplifier.*

*64. An optical amplification system, comprising:*
*a laser source generating an input beam having a nearly diffraction limited mode;*
*a multi-mode fiber amplifier;*
*a mode converter receiving the input beam and converting the mode of the input beam to match a fundamental mode of the multi-mode fiber amplifier, and providing a mode-converted input beam to said multi-mode fiber amplifier; and*
*a pump source coupled to said multi-mode fiber amplifier, said pump optically pumping said multi-mode fiber amplifier, said multi-mode fiber amplifier providing at an output thereof an amplified beam substantially in the fundamental mode, and wherein said multi-mode fiber amplifier is configured to provide a nearly diffraction limited output beam.*

* * * * *